（12）United States Patent
Dai et al.

(10) Patent No.: US 12,457,073 B2
(45) Date of Patent: Oct. 28, 2025

(54) POSITIONING REFERENCE SIGNAL HOPPING FOR REDUCED CAPABILITY USER EQUIPMENT

(71) Applicant: QUALCOMM Incorporated, San Diego, CA (US)

(72) Inventors: Jing Dai, Beijing (CN); Chao Wei, Beijing (CN); Hao Xu, Beijing (CN); Chenxi Hao, Beijing (CN); Qiaoyu Li, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 483 days.

(21) Appl. No.: 17/914,959

(22) PCT Filed: May 21, 2020

(86) PCT No.: PCT/CN2020/091545
§ 371 (c)(1),
(2) Date: Sep. 27, 2022

(87) PCT Pub. No.: WO2021/232345
PCT Pub. Date: Nov. 25, 2021

(65) Prior Publication Data
US 2023/0155775 A1 May 18, 2023

(51) Int. Cl.
*H04L 5/00* (2006.01)
*H04L 27/26* (2006.01)

(52) U.S. Cl.
CPC ...... *H04L 5/0051* (2013.01); *H04L 27/26025* (2021.01)

(58) Field of Classification Search
CPC ............. H04L 5/0051; H04L 27/26025; H04L 5/0012; H04L 5/1469; H04L 5/14;
(Continued)

(56) References Cited

U.S. PATENT DOCUMENTS 10,218,471 B1 * 2/2019 Kumar ................ H04L 27/0012
10,716,084 B2 7/2020 Wang et al.
(Continued)

FOREIGN PATENT DOCUMENTS

CN 104683008 B * 3/2018
CN 109392141 A 2/2019
(Continued)

OTHER PUBLICATIONS

Ericsson, On RSTD Requirement for FeMTC, R4-1705603, 3GPP TSG RAN WG4 Meeting, #83, Hangzhou, P.R. of China, May 15-19, 2017 (Year: 2017).*
(Continued)

*Primary Examiner* — Ayaz R Sheikh
*Assistant Examiner* — Louis Samara
(74) *Attorney, Agent, or Firm* — SUNSTEIN LLP

(57) ABSTRACT

Techniques are provided for positioning bandwidth limited user equipment (UE). In an example method for providing a positioning reference signal (PRS) to a bandwidth limited user equipment includes generating a PRS comprising a plurality of symbols occupying a frequency range in a first slot of a radio frame, the PRS including a first set of the plurality of symbols occupying a first portion of the frequency range, a second set of the plurality of symbols occupying a second portion of the frequency range, and transmitting the PRS to the bandwidth limited user equipment.

36 Claims, 19 Drawing Sheets

(58) Field of Classification Search
CPC ........ G01S 5/06; G01S 5/021; H04W 64/003; H04W 72/23
See application file for complete search history.

(56) References Cited

U.S. PATENT DOCUMENTS

| | | | | |
|---|---|---|---|---|
| 2017/0302419 | A1* | 10/2017 | Liu | H04W 72/23 |
| 2017/0339658 | A1* | 11/2017 | Wang | G01S 5/021 |
| 2018/0098300 | A1* | 4/2018 | Venkatraman | H04W 72/044 |
| 2018/0139763 | A1* | 5/2018 | Bitra | H04W 72/542 |
| 2019/0297489 | A1 | 9/2019 | Lei et al. | |
| 2019/0313416 | A1* | 10/2019 | Opshaug | H04W 72/0446 |
| 2019/0380107 | A1* | 12/2019 | Yoon | H04L 5/0053 |
| 2022/0052816 | A1* | 2/2022 | Lin | H04L 5/1469 |
| 2022/0116193 | A1* | 4/2022 | Gao | H04L 5/14 |
| 2022/0264491 | A1* | 8/2022 | Cha | H04L 5/0051 |

FOREIGN PATENT DOCUMENTS

| | | | |
|---|---|---|---|
| CN | 109644421 | A | 4/2019 |
| CN | 109923921 | A | 6/2019 |
| WO | 2017200708 | | 11/2017 |
| WO | 2019074282 | A1 | 4/2019 |

OTHER PUBLICATIONS

J. A. del Peral-Rosado, J. A. López-Salcedo and G. Seco-Granados, "Impact of frequency-hopping NB-IoT positioning in 4G and future 5G networks," 2017 IEEE (ICC Workshops), Paris, France, 2017, pp. 815-820, doi: 10.1109/ICCW.2017.7962759. (Year: 2017).*
Ericsson: "On RSTD Requirements for FeMTC", R4-1705603, 3GPP TSG RAN WG4 Meeting #83, May 19, 2017 (May 19, 2017), Hangzhou, P. R. of China, May 15-19, 2017, Section 2, pp. 1-5.
Huawei, et al., "Positioning OTDOA Enhancements for eMTC", RP-171424, 3GPP TSG RAN Meeting#76, West Palm Beach, USA, Jun. 5-9, 2017, Jun. 9, 2017 (Jun. 9, 2017) the Whole Document, pp. 1-4.
International Search Report and Written Opinion—PCT/CN2020/091545—ISA/EPO—Feb. 22, 2021.
Supplementary European Search Report—EP20937095—Search Authority—The Hague—Feb. 7, 2024.

* cited by examiner

POSITIONING REFERENCE SIGNAL HOPPING FOR REDUCED CAPABILITY USER EQUIPMENT

CROSS-REFERENCE TO RELATED APPLICATIONS

This application is the National Stage of International Application No. PCT/CN2020/091545, filed May 21, 2020, entitled "POSITIONING REFERENCE SIGNAL HOPPING FOR REDUCED CAPABILITY USER EQUIPMENT," which is assigned to the assignee hereof, and the entire contents of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G networks), a third-generation (3G) high speed data, Internet-capable wireless service, a fourth-generation (4G) service (e.g., LTE (Long Term Evolution) or WiMax), and a fifth generation (5G) wireless standard, referred to as New Radio (NR). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

Obtaining the location or position of a mobile device that is accessing a wireless network may be useful for many applications including, for example, emergency calls, personal navigation, asset tracking, locating a friend or family member, etc. Existing position methods include methods based on measuring radio signals transmitted from a variety of devices including satellite vehicles (SVs) and terrestrial radio sources in a wireless network such as base stations and access points. In methods based on terrestrial radio sources, a mobile device may measure the timing of signals received from two or more base stations and determine times of arrival, time differences of arrival and/or receive time-transmit time differences. Combining these measurements with known locations for the base stations and known transmission times from each base station may enable location of the mobile device using such position methods as Observed Time Difference Of Arrival (OTDOA), Round Trip signal propagation Time (RTT), or Enhanced Cell ID (ECID).

To further help location determination (e.g. for OTDOA or RTT), Positioning Reference Signals (PRS) may be transmitted by base stations in order to increase both measurement accuracy and the number of different base stations for which timing measurements can be obtained by a mobile device. The PRS signal transmissions may be radio access technology dependent such that one type of PRS may be compatible with 4G Long Term Evolution (LTE) technologies, and another type of PRS may be compatible with newer 5G New Radio (NR) technologies. Newer and smaller wireless devices may have reduced bandwidth capabilities as compared to previous premium devices such as mobile phones. These reduced capability devices may lack sufficient processing power and/or bandwidth to utilize current positioning technologies.

SUMMARY

In an example method for providing a positioning reference signal (PRS) to a bandwidth limited user equipment according to the disclosure includes generating a PRS comprising a plurality of symbols occupying a frequency range in a first slot of a radio frame, the PRS including a first set of the plurality of symbols occupying a first portion of the frequency range, a second set of the plurality of symbols occupying a second portion of the frequency range, and transmitting the PRS to the bandwidth limited user equipment.

Implementations of such a method may include one or more of the following features. The PRS may further include a first retuning gap between the first set of the plurality of symbols and the second set of the plurality of symbols. A duration of the first retuning gap may be based at least in part on a subcarrier spacing of the PRS. The duration of the first retuning gap may be 1 or 2 symbols and the subcarrier spacing is 15 kHz. The PRS may further includes a third set of the plurality of symbols occupying the first portion of the frequency range, and a fourth set of the plurality of symbols occupying the second portion of the frequency range. The PRS may further include a first retuning gap between the first set of the plurality of symbols and the second set of the plurality of symbols, a second retuning gap between the second set of the plurality of symbols and the third set of the plurality of symbols, and a third retuning gap between the third set of the plurality of symbols and the fourth set of the plurality of symbols. One or more of the plurality of symbols of the PRS may occupy a second slot in the radio frame.

An example method for providing a positioning reference signal (PRS) to a bandwidth limited user equipment according to the disclosure includes generating a PRS based on a first resource set, transmitting a first portion of the PRS in a first frequency range in a first slot of a radio frame, and transmitting a second portion of the PRS in a second frequency range in a second slot of the radio frame, such that the second frequency range is different from the first frequency range.

Implementations of such a method may include one or more of the following features. Transmissions may be delayed for a tuning gap prior to transmitting the second portion of the PRS. A duration of the tuning gap may be based at least in part on a subcarrier spacing of the PRS. The first slot and the second slot may be adjacent slots in the radio frame. The method may include transmitting a third portion of the PRS in a third frequency range in a third slot of the radio frame, and transmitting a fourth portion of the PRS in a fourth frequency range in a fourth slot of the radio frame, wherein the third frequency range is different from the fourth frequency range. The second slot may be adjacent to the first slot, the third slot may be adjacent to the second slot, and the fourth slot may be adjacent to the third slot. The method may include transmitting a third portion of the PRS in the second frequency range in a third slot of the radio frame, and transmitting a fourth portion of the PRS in the first frequency range in a fourth slot of the radio frame. The method may further include generating a second PRS based on a second resource set, transmitting a first portion of the second PRS in the first frequency range in a third slot of the radio frame, and transmitting a second portion of the second PRS in the second frequency range in a fourth slot of the radio frame. Transmitting the first portion of the second PRS may occur in a slot adjacent to a slot when the first portion of the PRS is transmitted, and there may be no retuning gap between transmitting the first portion of the PRS and transmitting the first portion of the second PRS.

An example method for facilitating the positioning of a bandwidth limited user equipment according to the disclosure includes receiving a first set of symbols in a positioning reference signal (PRS), wherein the PRS comprises a plurality of symbols occupying a frequency range and the first set of symbols are in a first portion of the frequency range, receiving a second set of symbols in the PRS in a second portion of the frequency range, and obtaining measurement information based on the PRS.

Implementation of such a method may include one or more of the following features. The second set of symbols may be received after a retuning gap subsequent to receiving the first set of symbols. A duration of the retuning gap may be based at least in part on a subcarrier spacing of the PRS. The duration of the retuning gap may be 1 or 2 symbols and the subcarrier spacing is 15 kHz. The method may include receiving a third set of symbols in the PRS occupying the first portion of the frequency range, and receiving a fourth set of symbols in the PRS occupying the second portion of the frequency range. The second set of symbols may be received after a first retuning gap subsequent to receiving the first set of symbols, the third set of symbols may be received after a second retuning gap subsequent to receiving the second set of symbols, and the fourth set of symbols may be received after a third retuning gap subsequent to receiving the third set of symbols. One or more of the plurality of symbols in the PRS may be received in a second slot of a radio frame.

An example method for facilitating the positioning of a bandwidth limited user equipment with a positioning reference signal (PRS) according to the disclosure includes receiving a first portion of the PRS in a first frequency range in a first slot of a radio frame, and receiving a second portion of the PRS in a second frequency range in a second slot of the radio frame, wherein the second frequency range is different from the first frequency range, and obtaining measurement information based on the PRS. A transceiver may be retuned during a tuning gap prior to receiving the second portion of the PRS. A duration of the tuning gap may be based at least in part on a subcarrier spacing of the PRS. The first slot and the second slot may be adjacent slots in the radio frame. The method may include receiving a third portion of the PRS in a third frequency range in a third slot of the radio frame, and receiving a fourth portion of the PRS in a fourth frequency range in a fourth slot of the radio frame, wherein the third frequency range is different from the fourth frequency range. The second slot may be adjacent to the first slot, the third slot may be adjacent to the second slot, and the fourth slot may be adjacent to the third slot. The method may include receiving a third portion of the PRS in the second frequency range in a third slot of the radio frame, and receiving a fourth portion of the PRS in the first frequency range in a fourth slot of the radio frame. The method may include receiving a first portion of a second PRS in the first frequency range in a third slot of the radio frame, wherein the second PRS is based on a second resource set, and receiving a second portion of the second PRS in the second frequency range in a fourth slot of the radio frame. Receiving the first portion of the second PRS may occur in a slot adjacent to a slot when the first portion of the PRS is received, and there may be no retuning gap between receiving the first portion of the PRS and receiving the first portion of the second PRS.

An example apparatus for providing a positioning reference signal (PRS) to a bandwidth limited user equipment according to the disclosure includes a memory, at least one transceiver, at least one processor communicatively coupled to the memory and the at least one transceiver and configured to generate a PRS comprising a plurality of symbols occupying a frequency range in a first slot of a radio frame, the PRS including a first set of the plurality of symbols occupying a first portion of the frequency range, a second set of the plurality of symbols occupying a second portion of the frequency range, and transmit the PRS to the bandwidth limited user equipment.

An example apparatus for providing a positioning reference signal (PRS) to a bandwidth limited user equipment according to the disclosure includes a memory, at least one transceiver, at least one processor communicatively coupled to the memory and the at least one transceiver and configured to generate a PRS based on a first resource set, transmit a first portion of the PRS in a first frequency range in a first slot of a radio frame, and transmit a second portion of the PRS in a second frequency range in a second slot of the radio frame, wherein the second frequency range is different from the first frequency range.

An example apparatus for facilitating the positioning of a bandwidth limited user equipment according to the disclosure includes a memory, at least one transceiver, at least one processor communicatively coupled to the memory and the at least one transceiver and configured to receive a first set of symbols in a positioning reference signal (PRS), wherein the PRS comprises a plurality of symbols occupying a frequency range and the first set of symbols are in a first portion of the frequency range, receive a second set of symbols in the PRS in a second portion of the frequency range, and obtain measurement information based on the PRS.

An example apparatus for facilitating the positioning of a bandwidth limited user equipment with a positioning reference signal (PRS) according to the disclosure includes a memory, at least one transceiver, at least one processor communicatively coupled to the memory and the at least one transceiver and configured to receive a first portion of the PRS in a first frequency range in a first slot of a radio frame, and receive a second portion of the PRS in a second frequency range in a second slot of the radio frame, wherein the second frequency range is different from the first frequency range; and obtain measurement information based on the PRS.

An example apparatus for providing a positioning reference signal (PRS) to a bandwidth limited user equipment according to the disclosure includes means for generating a PRS comprising a plurality of symbols occupying a frequency range in a first slot of a radio frame, the PRS including a first set of the plurality of symbols occupying a first portion of the frequency range, a second set of the plurality of symbols occupying a second portion of the frequency range, and means for transmitting the PRS to the bandwidth limited user equipment.

An example apparatus for providing a positioning reference signal (PRS) to a bandwidth limited user equipment according to the disclosure includes means for generating a PRS based on a first resource set, means for transmitting a first portion of the PRS in a first frequency range in a first slot of a radio frame, and means for transmitting a second portion of the PRS in a second frequency range in a second slot of the radio frame, wherein the second frequency range is different from the first frequency range.

An example apparatus for facilitating the positioning of a bandwidth limited user equipment according to the disclosure includes means for receiving a first set of symbols in a positioning reference signal (PRS), wherein the PRS comprises a plurality of symbols occupying a frequency range and the first set of symbols are in a first portion of the frequency range, means for receiving a second set of symbols in the PRS in a second portion of the frequency range, and means for obtaining measurement information based on the PRS.

An example apparatus for facilitating the positioning of a bandwidth limited user equipment with a positioning reference signal (PRS) according to the disclosure includes means for receiving a first portion of the PRS in a first frequency range in a first slot of a radio frame, means for receiving a second portion of the PRS in a second frequency range in a second slot of the radio frame, wherein the second frequency range is different from the first frequency range; and means for obtaining measurement information based on the PRS.

An example non-transitory processor-readable storage medium comprising processor-readable instructions configured to cause one or more processors to provide a positioning reference signal (PRS) to a bandwidth limited user equipment according to the disclosure includes code for generating a PRS comprising a plurality of symbols occupying a frequency range in a first slot of a radio frame, the PRS including a first set of the plurality of symbols occupying a first portion of the frequency range, a second set of the plurality of symbols occupying a second portion of the frequency range, and code for transmitting the PRS to the bandwidth limited user equipment.

An example non-transitory processor-readable storage medium comprising processor-readable instructions configured to cause one or more processors to provide a positioning reference signal (PRS) to a bandwidth limited user equipment according to the disclosure includes code for generating a PRS based on a first resource set, code for transmitting a first portion of the PRS in a first frequency range in a first slot of a radio frame, and code for transmitting a second portion of the PRS in a second frequency range in a second slot of the radio frame, wherein the second frequency range is different from the first frequency range.

An example non-transitory processor-readable storage medium comprising processor-readable instructions configured to cause one or more processors to facilitate the positioning of a bandwidth limited user equipment according to the disclosure includes code for receiving a first set of symbols in a positioning reference signal (PRS), wherein the PRS comprises a plurality of symbols occupying a frequency range and the first set of symbols are in a first portion of the frequency range, code for receiving a second set of symbols in the PRS in a second portion of the frequency range; and code for obtaining measurement information based on the PRS.

An example non-transitory processor-readable storage medium comprising processor-readable instructions configured to cause one or more processors to facilitate the positioning of a bandwidth limited user equipment with a positioning reference signal (PRS) according to the disclosure includes code for receiving a first portion of the PRS in a first frequency range in a first slot of a radio frame, code for receiving a second portion of the PRS in a second frequency range in a second slot of the radio frame, wherein the second frequency range is different from the first frequency range, and code for obtaining measurement information based on the PRS.

Items and/or techniques described herein may provide one or more of the following capabilities, as well as other capabilities not mentioned. A New Radio Light user equipment (NR-Light UE), including medium-tier and low-tier user equipment (UE) such as wristwatches, fitness bands, industrial wireless sensors (IWSN), or Internet of Things (IoT) devices, may have reduced bandwidth as compared to a premium UE, such as a smartphone, laptop, or similar device. Frequency hopping may be used to reduce the bandwidth of positioning reference signals (PRS). A PRS may be based on intra-PRS frequency hopping to include sets symbols in two or more frequency locations. The sets of symbols may be consecutive or may be separated by a retuning gap. A PRS physical resource block may extend into an adjacent slot in a radio frame. Inter-PRS frequency hopping may be used to provide portions of PRS in slot and frequency location combinations. Frequency hopping slot and frequency plans may be designed to reduce retuning time. PRS may be provided to bandwidth limited user equipment. The accuracy of PRS based positioning may be increased. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
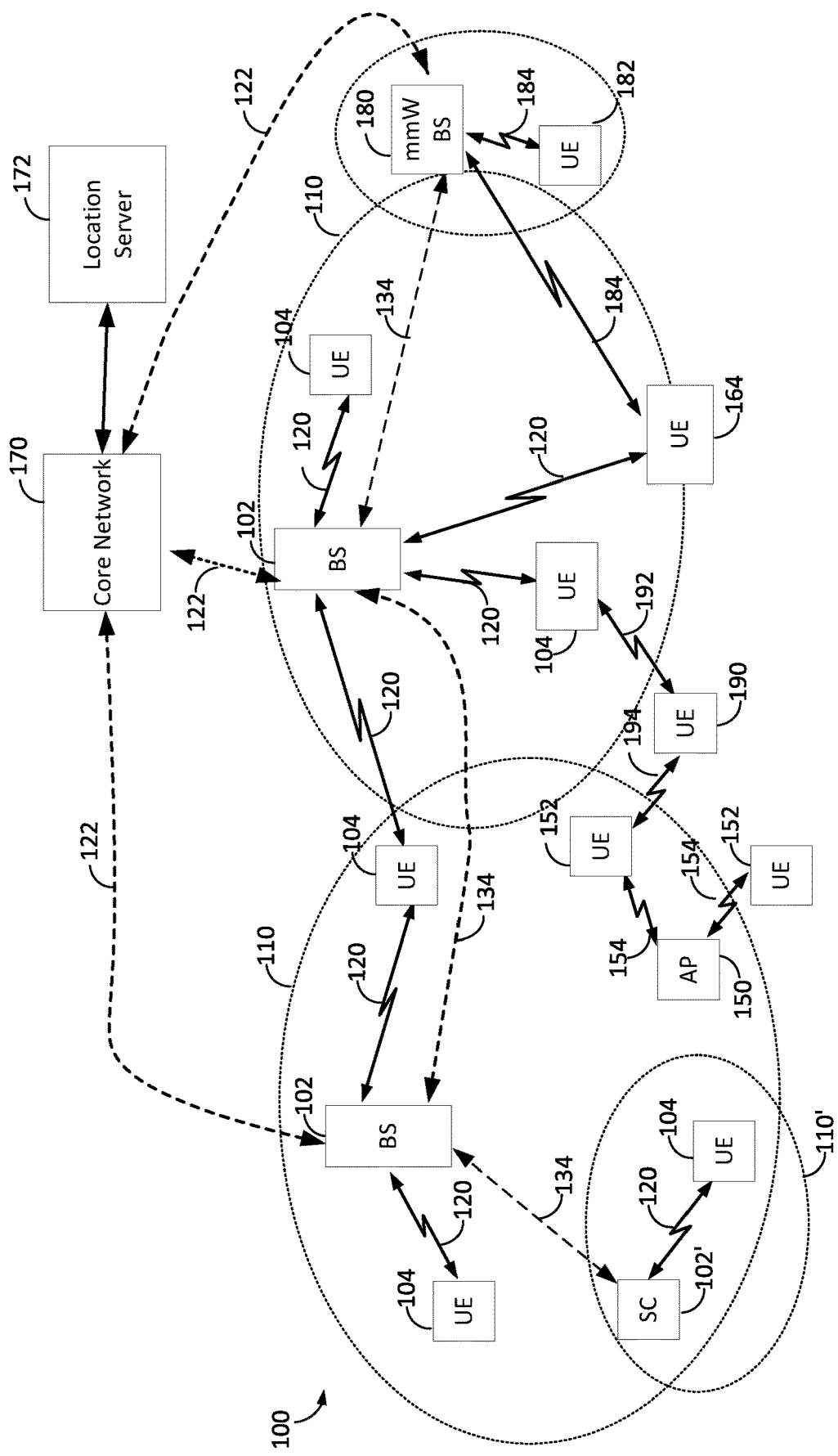
FIG. 1 illustrates an exemplary wireless communications system, according to various aspects.

Techniques are discussed herein for positioning bandwidth limited user equipment (UE). A NR-Light UE is an example of a bandwidth limited, or reduce capability, UE and may include medium-tier and low-tier user equipment, and may be wearable devices (e.g., fitness tracker, watch), industrial wireless sensors networks (IWSN), or other Internet of Things (IoT) devices with limited processing capacity. A NR-Light UE may be configured to operate on a reduced bandwidth (e.g., 5-20 MHz) as compared to a premium UE (e.g., 50 MHz for 15 kHz subcarrier spacing (SCS), 100 MHz for 30/60 kHz SCS for band n78(3300 MHz-3800 MHz)). The reduced bandwidth may result in reduced positioning accuracy. Further, the transmit power of a NR-Light UE may be reduced which may limit coverage area in which the NR-Light UE may access a wireless network. The techniques discussed herein provide for equivalent-grouped wideband positioning reference signals (PRS) by frequency hopping (FH) of narrowband PRS in NR systems. For example, the PRS may include frequency hopping within a PRS resource (e.g., intra-PRS resource FH) for symbol level frequency hopping, and/or the PRS include slot-level frequency hopping across consecutive slots (e.g., inter-PRS FH). These techniques are examples only, and not exhaustive.

Many features are described in terms of sequences of actions to be performed by, for example, elements of a computing device. Various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory processor-readable storage medium having stored therein a corresponding set of processor-readable instructions that, upon execution, would cause or instruct an associated processor of a device to perform the functionality described herein. Thus, various features of the disclosure may be embodied in a number of different forms, all of which are within the scope of the claimed subject matter.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "premium UE," "NR-Light UE," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on. In general, a reduced capability UE, such as NR-Light UE, is a UE with relatively reduced bandwidth and/or processing capabilities (i.e., as compared to a premium UE such as a smart phone). In example, a premium UE may be configured to perform as a reduced capability UE to conserve power or reduce bandwidth.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

Referring to FIG. 1, an example wireless communications system 100 includes components as shown. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). The macro cell base station may include eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. One or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. The foregoing illustrations are examples and do not the description or claims.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity).

In an example, the D2D P2P links 192 and 194 may be supported with any well-known D2D RAT, such as LTE Direct (LTE-D), WiFi Direct (WiFi-D), Bluetooth®, and so on. In an aspect, the UE 190 may be a NR-Light UE, and the UE 104 to which it is connected over the D2D P2P link 192 may be a premium UE. In an example, the D2D P2P link 192 may be a sidelink channel configured to support channel state information reference signals (CSI-RS) and Channel Quality Information and Rank Indicator (CQI/RI) measurements.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
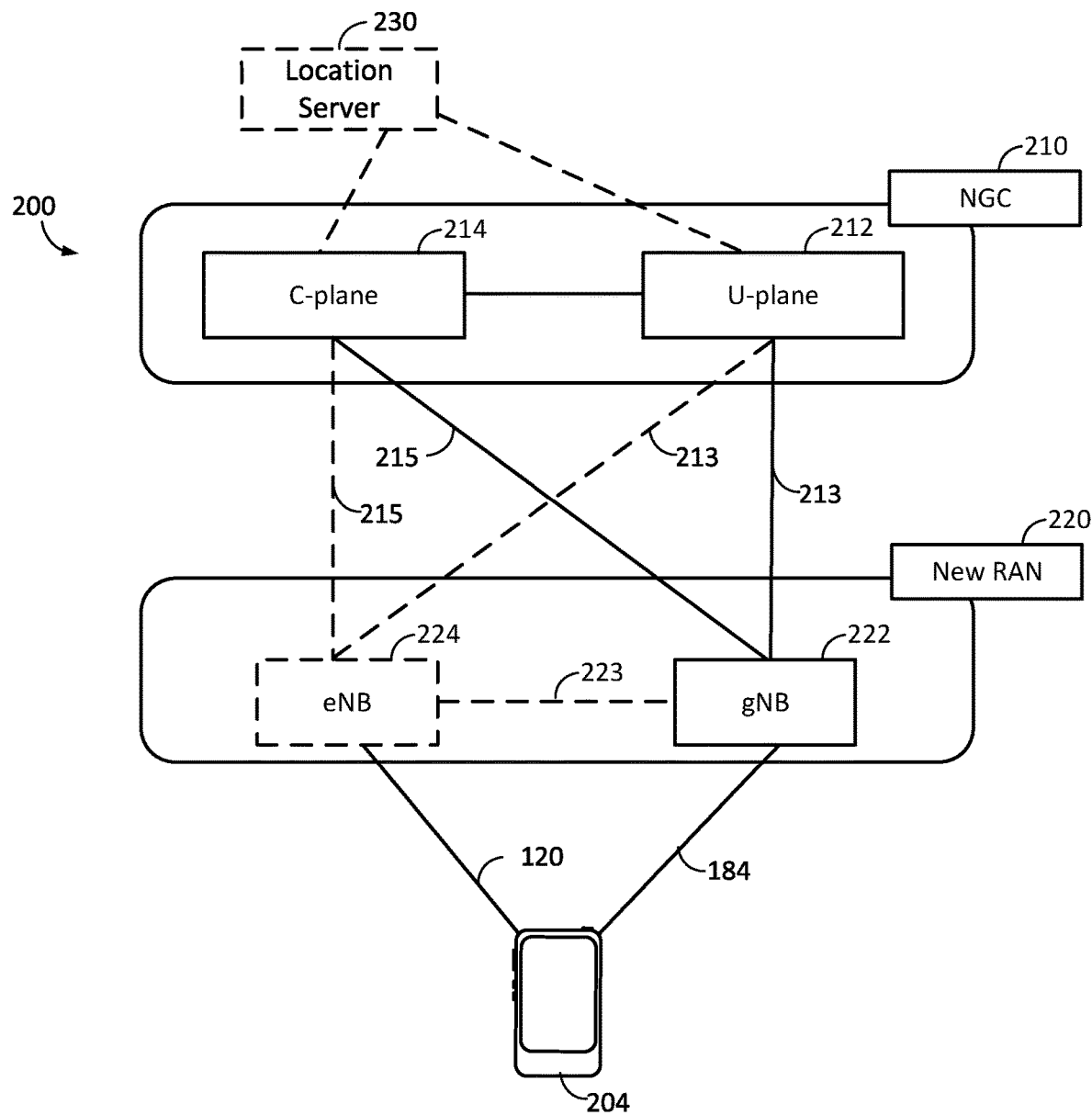
FIGS. 2A and 2B illustrate example wireless network structures, according to various aspects.

Referring to FIG. 2A, an example wireless network structure 200 is shown. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). A location server 230 may be included, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
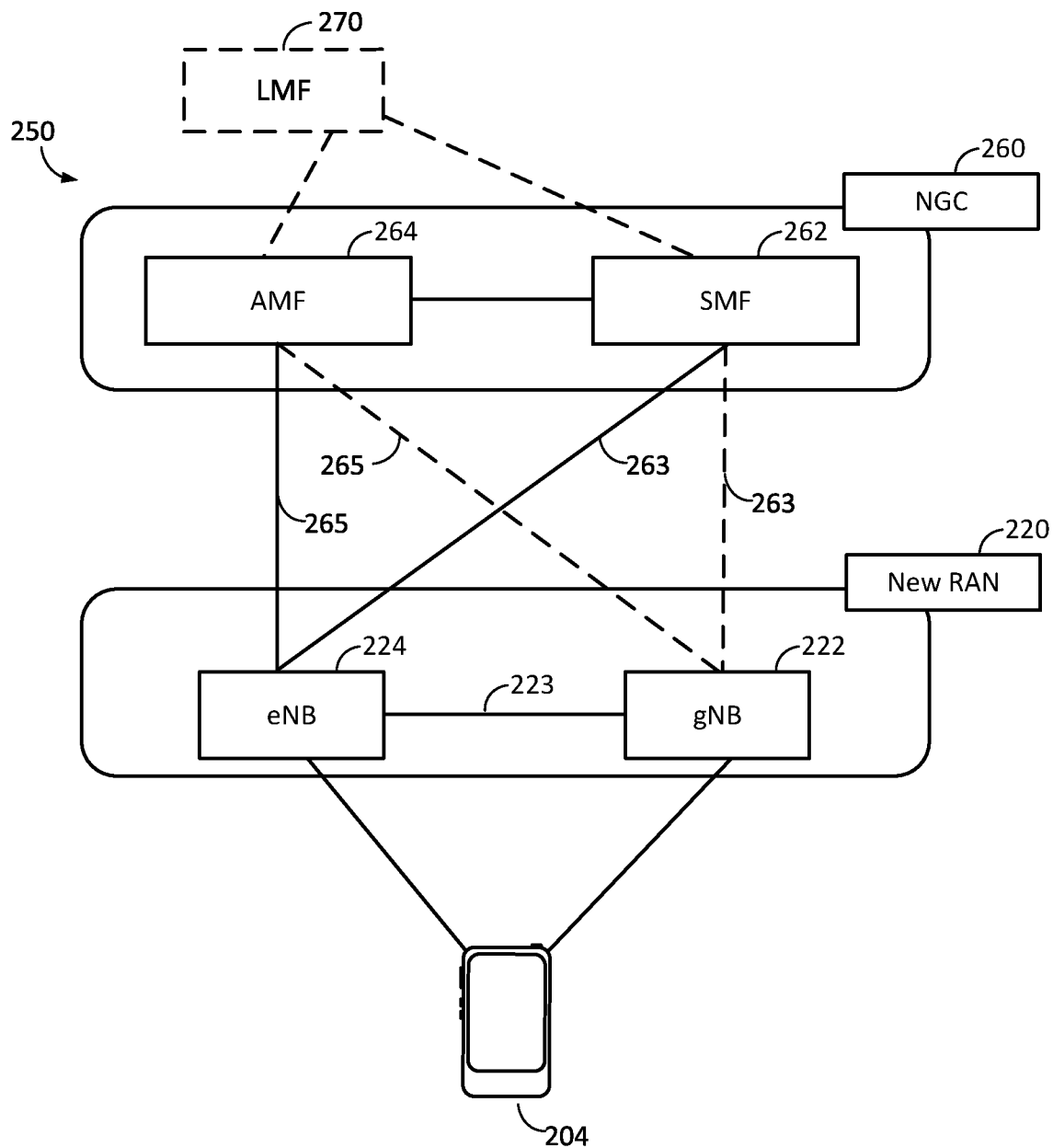

Referring to FIG. 2B, another example wireless network structure 250 is shown. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the Location Management Function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

The LMF 270 may be included, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
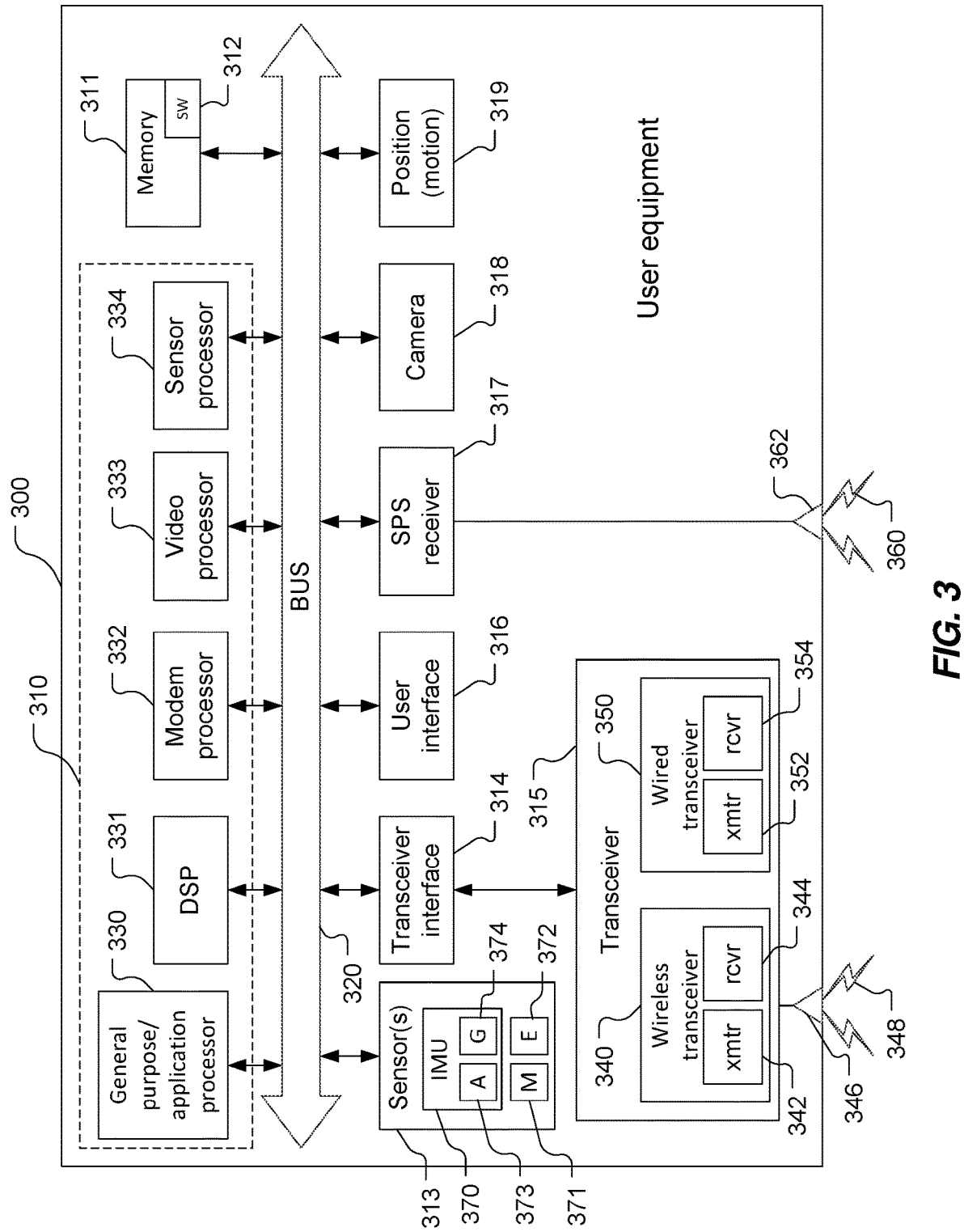
FIG. 3 is a block diagram of components of an example user equipment.

Referring to FIG. 3, a UE 300 is an example of the UEs 104, 164, 182, 190 and may comprise a computing platform including a processor 310, memory 311 including software (SW) 312, one or more sensors 313, a transceiver interface 314 for a transceiver 315, a user interface 316, a Satellite Positioning System (SPS) receiver 317, a camera 318, and a position (motion) device 319. The processor 310, the memory 311, the sensor(s) 313, the transceiver interface 314, the user interface 316, the SPS receiver 317, the camera 318, and the position (motion) device 319 may be communicatively coupled to each other by a bus 320 (which may be configured, e.g., for optical and/or electrical communication). One or more of the shown apparatus (e.g., the camera 318, the position (motion) device 319, and/or one or more of the sensor(s) 313, etc.) may be omitted from the UE 300. The processor 310 may include one or more intelligent hardware devices, e.g., a central processing unit (CPU), a microcontroller, an application specific integrated circuit (ASIC), etc. The processor 310 may comprise multiple processors including a general-purpose/application processor 330, a Digital Signal Processor (DSP) 331, a modem processor 332, a video processor 333, and/or a sensor processor 334. One or more of the processors 330-334 may comprise multiple devices (e.g., multiple processors). For example, the sensor processor 334 may comprise, e.g., processors for radar, ultrasound, and/or lidar, etc. The modem processor 332 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 300 for connectivity. The memory 311 is a non-transitory storage medium that may include random access memory (RAM), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer only to the processor 310 performing a function, but this includes other implementations such as where the processor 310 executes software and/or firmware. The description may refer to the processor 310 performing a function as shorthand for one or more of the processors 330-334 performing the function. The description may refer to the UE 300 performing a function as shorthand for one or more appropriate components of the UE 300 performing the function. The processor 310 may include a memory with stored instructions in addition to and/or instead of the memory 311. Functionality of the processor 310 is discussed more fully below.

The configuration of the UE 300 shown in FIG. 3 is an example and not limiting of the invention, including the claims, and other configurations may be used. For example, an example configuration of the UE includes one or more of the processors 330-334 of the processor 310, the memory 311, and the wireless transceiver 340. Other example configurations include one or more of the processors 330-334 of the processor 310, the memory 311, the wireless transceiver 340, and one or more of the sensor(s) 313, the user interface 316, the SPS receiver 317, the camera 318, the PMD 319, and/or the wired transceiver 350. A reduced capability UE (e.g., NR-Light UE), may have fewer components than described for the UE 300 as well as smaller processors (e.g., less processing power) and reduced transmit and receive chains (e.g., fewer antennas, smaller transceivers, less capable modem).

The UE 300 may comprise the modem processor 332 that may be capable of performing baseband processing of signals received and down-converted by the transceiver 315 and/or the SPS receiver 317. The modem processor 332 may perform baseband processing of signals to be upconverted for transmission by the transceiver 315. Also, or alternatively, baseband processing may be performed by the processor 330 and/or the DSP 331. Other configurations, however, may be used to perform baseband processing.

The UE 300 may include the sensor(s) 313 that may include, for example, an Inertial Measurement Unit (IMU) 370, one or more magnetometers 371, and/or one or more environment sensors 372. The IMU 370 may comprise one or more inertial sensors, for example, one or more accelerometers 373 (e.g., collectively responding to acceleration of the UE 300 in three dimensions) and/or one or more gyroscopes 374. The magnetometer(s) may provide measurements to determine orientation (e.g., relative to magnetic north and/or true north) that may be used for any of a variety of purposes, e.g., to support one or more compass applications. The environment sensor(s) 372 may comprise, for example, one or more temperature sensors, one or more barometric pressure sensors, one or more ambient light sensors, one or more camera imagers, and/or one or more microphones, etc. The sensor(s) 313 may generate analog and/or digital signals indications of which may be stored in the memory 311 and processed by the DSP 331 and/or the processor 330 in support of one or more applications such as, for example, applications directed to positioning and/or navigation operations.

The sensor(s) 313 may be used in relative location measurements, relative location determination, motion determination, etc. Information detected by the sensor(s) 313 may be used for motion detection, relative displacement, dead reckoning, sensor-based location determination, and/or sensor-assisted location determination. The sensor(s) 313 may be useful to determine whether the UE 300 is fixed (stationary) or mobile and/or whether to report certain useful information to the server (i.e., LMF 120, SLP 132 or E-SMLC 208) regarding the mobility of the UE 300. For example, based on the information obtained/measured by the sensor(s) 313, the UE 300 may notify/report to the server (i.e., LMF 120, SLP 132 or E-SMLC 208) that the UE 300 has detected movements or that the UE 300 has moved, and report the relative displacement/distance (e.g., via dead reckoning, or sensor-based location determination, or sensor-assisted location determination enabled by the sensor(s) 313). In another example, for relative positioning information, the sensors/IMU can be used to determine the angle and/or orientation of the other device with respect to the UE 300, etc.

The IMU 370 may be configured to provide measurements about a direction of motion and/or a speed of motion of the UE 300, which may be used in relative location determination. For example, the one or more accelerometers 373 and/or the one or more gyroscopes 374 of the IMU 370 may detect, respectively, a linear acceleration and a speed of rotation of the UE 300. The linear acceleration and speed of rotation measurements of the UE 300 may be integrated over time to determine an instantaneous direction of motion as well as a displacement of the UE 300. The instantaneous direction of motion and the displacement may be integrated to track a location of the UE 300. For example, a reference location of the UE 300 may be determined, e.g., using the SPS receiver 317 (and/or by some other means) for a moment in time and measurements from the accelerometer(s) 373 and gyroscope(s) 374 taken after this moment in time may be used in dead reckoning to determine present location of the UE 300 based on movement (direction and distance) of the UE 300 relative to the reference location.

The magnetometer(s) 371 may determine magnetic field strengths in different directions which may be used to determine orientation of the UE 300. For example, the orientation may be used to provide a digital compass for the UE 300. The magnetometer(s) 371 may include a two-dimensional magnetometer configured to detect and provide indications of magnetic field strength in two orthogonal dimensions. Also, or alternatively, the magnetometer(s) 371 may include a three-dimensional magnetometer configured to detect and provide indications of magnetic field strength in three orthogonal dimensions. The magnetometer(s) 371 may provide means for sensing a magnetic field and providing indications of the magnetic field, e.g., to the processor 310.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels) and/or receiving (e.g., on one or more downlink channels) wireless signals 348 and transducing signals from the wireless signals 348 to wired (e.g., electrical and/or optical) signals and from wired (e.g., electrical and/or optical) signals to the wireless signals 348. A PRS reference signal transmission schedule and associated measurements may be obtained via the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 350 may include a transmitter 352 and a receiver 354 configured for wired communication, e.g., with the network 135 to send communications to, and receive communications from, the gNB 110-1, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication. The transceiver 315 may be communicatively coupled to the transceiver interface 314, e.g., by optical and/or electrical connection. The transceiver interface 314 may be at least partially integrated with the transceiver 315.

The user interface 316 may comprise one or more of several devices such as, for example, a speaker, microphone, display device, vibration device, keyboard, touch screen, etc. The user interface 316 may include more than one of any of these devices. The user interface 316 may be configured to enable a user to interact with one or more applications hosted by the UE 300. For example, the user interface 316 may store indications of analog and/or digital signals in the memory 311 to be processed by DSP 331 and/or the general-purpose processor 330 in response to action from a user. Similarly, applications hosted on the UE 300 may store indications of analog and/or digital signals in the memory 311 to present an output signal to a user. The user interface 316 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also, or alternatively, the user interface 316 may comprise one or more touch sensors responsive to touching and/or pressure, e.g., on a keyboard and/or touch screen of the user interface 316.

The SPS receiver 317 (e.g., a Global Positioning System (GPS) receiver) may be capable of receiving and acquiring SPS signals 360 via an SPS antenna 362. The antenna 362 is configured to transduce the wireless signals 360 to wired signals, e.g., electrical, or optical signals, and may be integrated with the antenna 346. The SPS receiver 317 may be configured to process, in whole or in part, the acquired SPS signals 360 for estimating a location of the UE 300. For example, the SPS receiver 317 may be configured to determine location of the UE 300 by trilateration using the SPS signals 360. The general-purpose processor 330, the memory 311, the DSP 331 and/or one or more specialized processors (not shown) may be utilized to process acquired SPS signals, in whole or in part, and/or to calculate an estimated location of the UE 300, in conjunction with the SPS receiver 317. The memory 311 may store indications (e.g., measurements) of the SPS signals 360 and/or other signals (e.g., signals acquired from the wireless transceiver 340) for use in performing positioning operations. The general-purpose processor 330, the DSP 331, and/or one or more specialized processors, and/or the memory 311 may provide or support a location engine for use in processing measurements to estimate a location of the UE 300.

The UE 300 may include the camera 318 for capturing still or moving imagery. The camera 318 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 330 and/or the DSP 331. Also, or alternatively, the video processor 333 may perform conditioning, encoding, compression, and/or manipulation of signals representing captured images. The video processor 333 may decode/decompress stored image data for presentation on a display device (not shown), e.g., of the user interface 316.

The position (motion) device (PMD) 319 may be configured to determine a position and possibly motion of the UE 300. For example, the PMD 319 may communicate with, and/or include some or all of, the SPS receiver 317. The PMD 319 may also or alternatively be configured to determine location of the UE 300 using terrestrial-based signals such as 4G LTE and 5G NR PRS transmission schedule (e.g., at least some of the signals 348) for trilateration, for assistance with obtaining and using the SPS signals 360, or both. The PMD 319 may be configured to use one or more other techniques (e.g., relying on the UE's self-reported location (e.g., part of the UE's position beacon)) for determining the location of the UE 300, and may use a combination of techniques (e.g., SPS and terrestrial positioning signals) to determine the location of the UE 300. The PMD 319 may include one or more of the sensors 313 (e.g., gyroscope(s), accelerometer(s), magnetometer(s), etc.) that may sense orientation and/or motion of the UE 300 and provide indications thereof that the processor 310 (e.g., the processor 330 and/or the DSP 331) may be configured to use to determine motion (e.g., a velocity vector and/or an acceleration vector) of the UE 300. The PMD 319 may be configured to provide indications of uncertainty and/or error in the determined position and/or motion.

Figure 4:
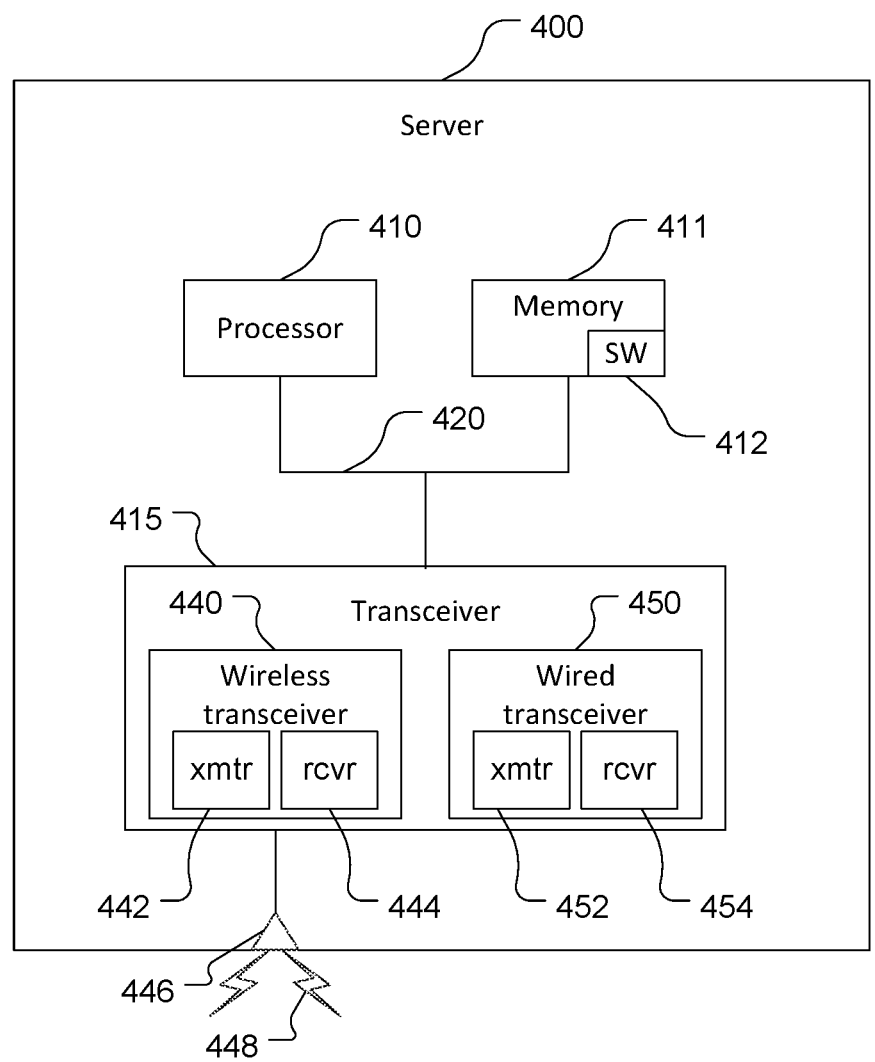
FIG. 4 is a block diagram of components of an example server.

Referring to FIG. 4, with further reference to FIGS. 1-3, a block diagram of components of an example server 400 is shown. The server 400 is an example of a location server 230 such as the LMF 270, the AMF 264, and the SMF 262. The server 400 may also be an example of base station such as the gNB 222, and the eNB 224. A server 400 may also include, or be connected to, one or more SPS receivers (not pictured in FIG. 4). The server 400 comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 4). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more uplink channels) and/or receiving (e.g., on one or more downlink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 300, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the network 135 to send communications to, and receive communications from, the gNB 222, and the eNB 224, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the invention, including the claims, and other configurations may be used. For example, the wireless transceiver 440 may be omitted. Also, or alternatively, the description herein discusses that the server 400 is configured to perform or performs several functions, but one or more of these functions may be performed by the gNB 222, the eNB 224 and/or the UE 300.

Figure 5:
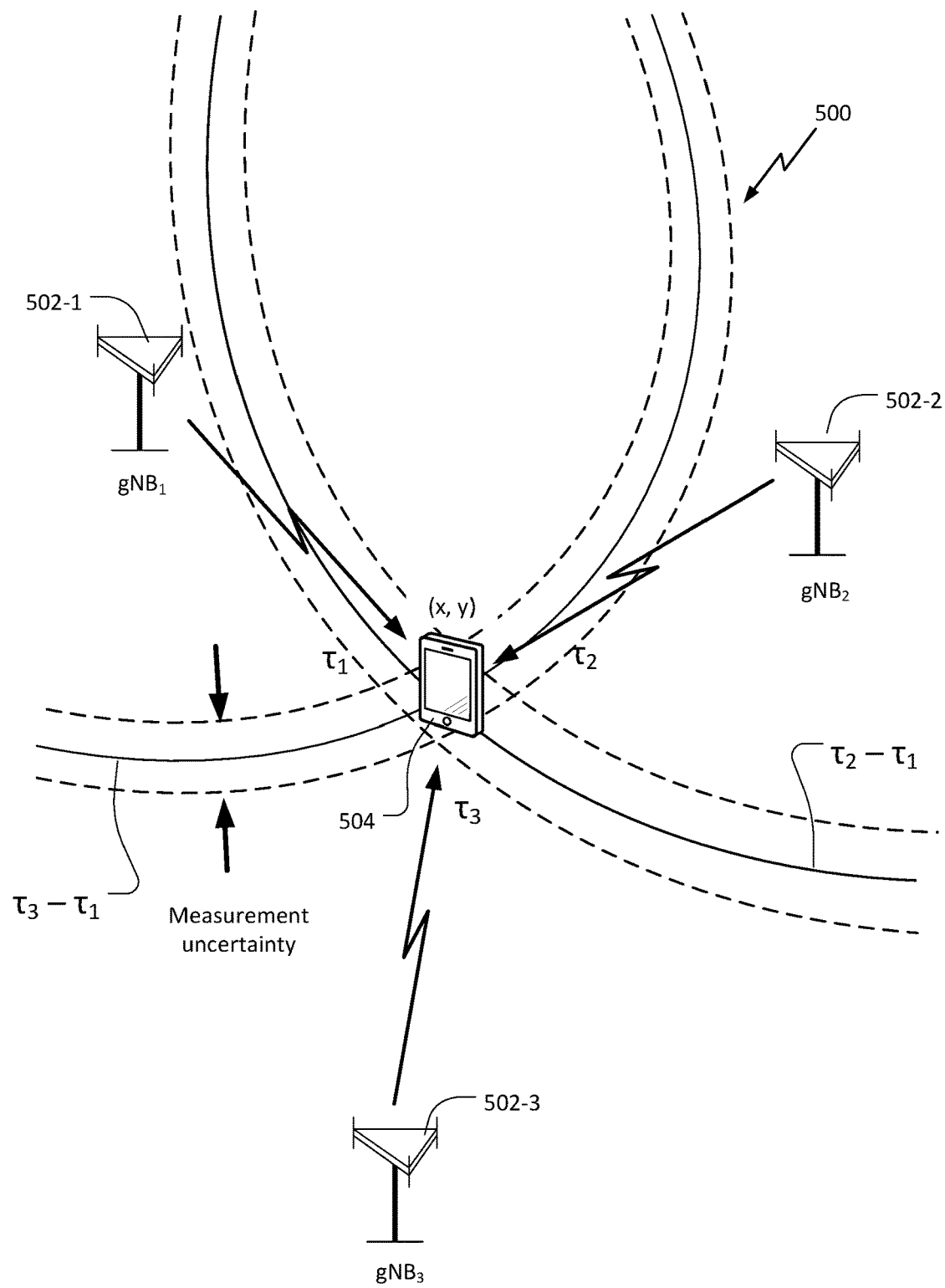
FIG. 5 illustrate an example technique for determining a position of a premium user equipment using information obtained from a plurality of base stations.

Referring to FIG. 5, an exemplary wireless communications system 500 according to various aspects of the disclosure is shown. In the example of FIG. 5, a UE 504, which may correspond to any of the UEs described herein, is attempting to calculate a position estimate, or assist another entity (e.g., a base station or core network component, another UE, a location server, a third party application, etc.) to calculate a position estimate. The UE 504 may communicate wirelessly with a plurality of base stations 502-1, 502-2, and 502-3 which may correspond to any combination of the base stations described herein, using RF signals and standardized protocols for the modulation of the RF signals and the exchange of information packets. By extracting different types of information from the exchanged RF signals, and utilizing the layout of the wireless communications system 500 (e.g., the base stations locations, geometry, etc.), the UE 504 may determine a position estimate, or assist in the determination of a position estimate, in a predefined reference coordinate system. In an aspect, the UE 504 may specify the position estimate using a two-dimensional (2D) coordinate system; however, the aspects disclosed herein are not so limited, and may also be applicable to determining position estimates using a three-dimensional (3D) coordinate system, if the extra dimension is desired. Additionally, while FIG. 5 illustrates one UE 504 and four base stations 502-1, 502-2, 502-3, as will be appreciated, there may be more UEs 504 and more or fewer base stations.

To support position estimates, the base stations 502-1, 502-2, 502-3 may be configured to broadcast positioning reference signals (e.g., PRS, NRS, TRS, CRS, etc.) to UEs 504 in their coverage area to enable a UE 504 to measure characteristics of such reference signals. For example, the observed time difference of arrival (OTDOA) positioning method is a multilateration method in which the UE 504 measures the time difference, known as a reference signal time difference (RSTD), between specific reference signals (e.g., PRS, CRS, CSI-RS, etc.) transmitted by different pairs of network nodes (e.g., base stations, antennas of base stations, etc.) and either reports these time differences to a location server, such as the location server 230 or LMF 270, or computes a location estimate itself from these time differences.

Generally, RSTDs are measured between a reference network node (e.g., base station 502-1 in the example of FIG. 5) and one or more neighbor network nodes (e.g., base stations 502-2 and 502-3 in the example of FIG. 5). The reference network node remains the same for all RSTDs measured by the UE 504 for any single positioning use of OTDOA and would typically correspond to the serving cell for the UE 504 or another nearby cell with good signal strength at the UE 504. In an aspect, where a measured network node is a cell supported by a base station, the neighbor network nodes would normally be cells supported by base stations different from the base station for the reference cell and may have good or poor signal strength at the UE 504. The location computation can be based on the measured time differences (e.g., RSTDs) and knowledge of the network nodes' locations and relative transmission timing (e.g., regarding whether network nodes are accurately synchronized or whether each network node transmits with some known time difference relative to other network nodes).

To assist positioning operations, a location server (e.g., location server 230, LMF 270) may provide OTDOA assistance data to the UE 504 for the reference network node (e.g., base station 502-1 in the example of FIG. 5) and the neighbor network nodes (e.g., base stations 502-2 and 502-3 in the example of FIG. 5) relative to the reference network node. For example, the assistance data may provide the center channel frequency of each network node, various reference signal configuration parameters (e.g., the number of consecutive positioning subframes, periodicity of positioning subframes, muting sequence, frequency hopping sequence, reference signal identifier (ID), reference signal bandwidth), a network node global ID, and/or other cell related parameters applicable to OTDOA. The OTDOA assistance data may indicate the serving cell for the UE 504 as the reference network node.

In some cases, OTDOA assistance data may also include expected RSTD parameters, which provide the UE 504 with information about the RSTD values the UE 504 is expected to measure at its current location between the reference network node and each neighbor network node, together with an uncertainty of the expected RSTD parameter. The expected RSTD, together with the associated uncertainty, may define a search window for the UE 504 within which the UE 504 is expected to measure the RSTD value. OTDOA assistance information may also include reference signal configuration information parameters, which allow a UE 504 to determine when a reference signal positioning occasion occurs on signals received from various neighbor network nodes relative to reference signal positioning occasions for the reference network node, and to determine the reference signal sequence transmitted from various network nodes in order to measure a signal time of arrival (ToA) or RSTD.

In an aspect, while the location server (e.g., location server 230, LMF 270) may send the assistance data to the UE 504, alternatively, the assistance data can originate directly from the network nodes (e.g., base stations 502-1, 502-2, 502-3) themselves (e.g., in periodically broadcasted overhead messages, etc.). Alternatively, the UE 504 can detect neighbor network nodes without the use of assistance data.

The UE 504 (e.g., based in part on the assistance data, if provided) can measure and (optionally) report the RSTDs between reference signals received from pairs of network nodes. Using the RSTD measurements, the known absolute or relative transmission timing of each network node, and the known position(s) of the transmitting antennas for the reference and neighboring network nodes, the network (e.g., location server 230/LMF 270, a base station) or the UE 504 may estimate a position of the UE 504. More particularly, the RSTD for a neighbor network node "k" relative to a reference network node "Ref" may be given as (ToA$_k$–ToA$_{Ref}$), where the ToA values may be measured modulo one subframe duration (1 ms) to remove the effects of measuring different subframes at different times. In the example of FIG. 5, the measured time differences between the reference cell of base station 502-1 and the cells of neighboring base stations 502-2 and 502-3 are represented as $\tau_2-\tau_1$ and $\tau_3-\tau_1$, where $\tau_1$, $\tau_2$, and $\tau_3$ represent the ToA of a reference signal from the transmitting antenna(s) of base station 502-1, 502-2, and 502-3, respectively. The UE 504 may then convert the ToA measurements for different network nodes to RSTD measurements and (optionally) send them to the location server 230/LMF 270. Using (i) the RSTD measurements, (ii) the known absolute or relative transmission timing of each network node, (iii) the known position(s) of physical transmitting antennas for the reference and neighboring network nodes, and/or (iv) directional reference signal characteristics such as a direction of transmission, the UE's 504 position may be determined (either by the UE 504 or the location server 230/LMF 270).

Still referring to FIG. 5, when the UE 504 obtains a location estimate using OTDOA measured time differences, the necessary additional data (e.g., the network nodes' locations and relative transmission timing) may be provided to the UE 504 by a location server (e.g., location server 230, LMF 270). In some implementations, a location estimate for the UE 504 may be obtained (e.g., by the UE 504 or by the location server 230/LMF 270) from OTDOA measured time differences and from other measurements made by the UE 504 (e.g., measurements of signal timing from global positioning system (GPS) or other global navigation satellite system (GNSS) satellites). In these implementations, known as hybrid positioning, the OTDOA measurements may contribute towards obtaining the UE's 504 location estimate but may not wholly determine the location estimate.

Uplink time difference of arrival (UTDOA) is a similar positioning method to OTDOA, but is based on uplink reference signals (e.g., sounding reference signals (SRS), uplink positioning reference signals (UL PRS)) transmitted by the UE (e.g., UE 504). Further, transmission and/or reception beamforming at the base station 502-1, 502-2, 502-3 and/or UE 504 can enable wideband bandwidth at the cell edge for increased precision. Beam refinements may also leverage channel reciprocity procedures in 5G NR.

In NR, there is no requirement for precise timing synchronization across the network. Instead, it is sufficient to have coarse time-synchronization across gNBs (e.g., within a cyclic prefix (CP) duration of the OFDM symbols).

Round-trip-time (RTT)-based methods generally only need coarse timing synchronization, and as such, are a practical positioning method in NR.

Figure 6:
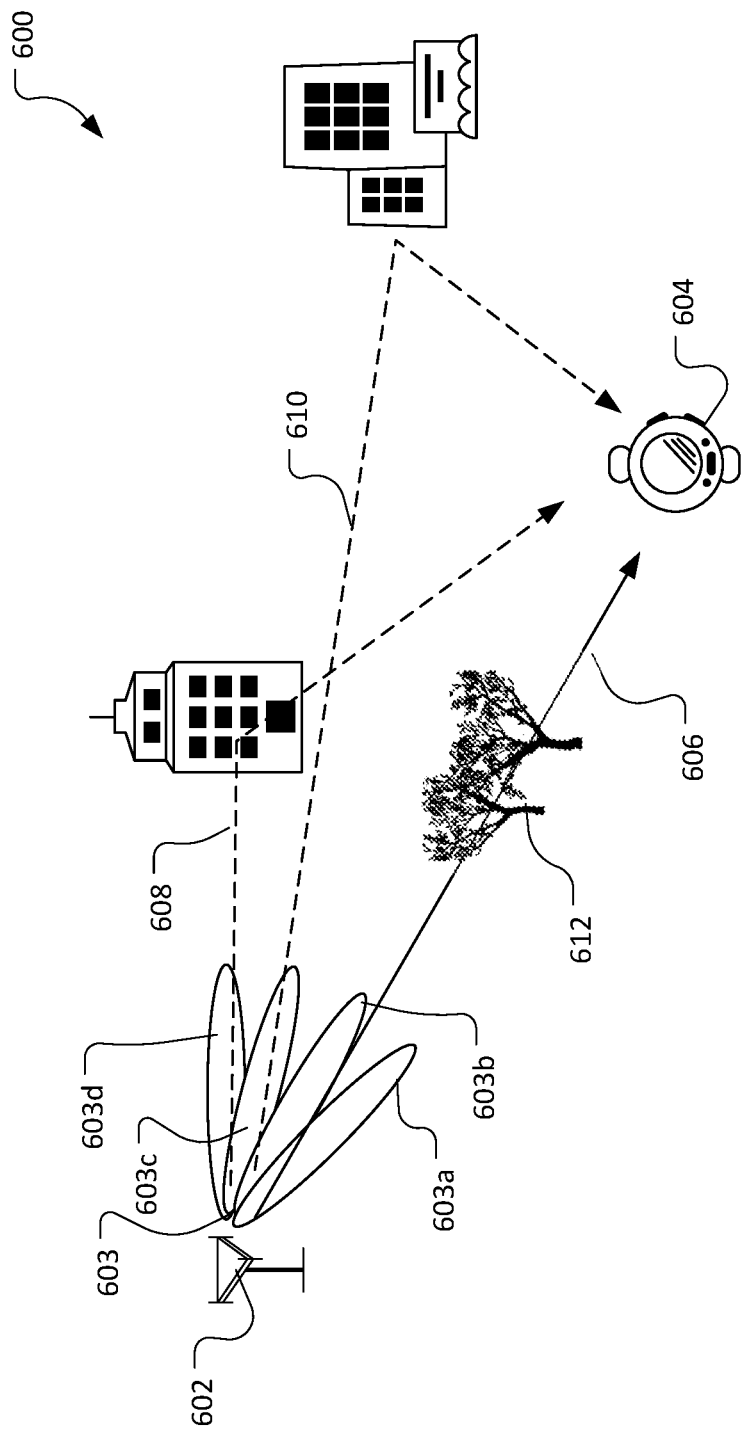
FIG. 6 is a conceptual diagram of an example position determination based on a line of sight signal.

Referring to FIG. 6, a conceptual diagram 600 of an example position determination based on a line of sight (LOS) signal is shown. A base station 602 is an example of the base stations previously described, and is configured to transmit a plurality of positioning reference signals (PRS) 603. As depicted in FIG. 6, each of the PRSs may be beam formed and transmitted in different directions. A PRS resource is a logical construct used to define the parameters of a PRS transmission, such as the direction and content of a PRS transmission. For example, a first PRS beam 603a is based on a first PRS resource, as second PRS beam 603b is based on a second PRS resource, a third PRS beam 603c is based on a third PRS resource, and a fourth PRS beam 603d is based on a fourth PRS resource. A UE 604 is configured to measure characteristics of received PRSs. In an example, the UE 604 is a NR-Light UE with reduced bandwidth capabilities. An issue with utilizing a reduce bandwidth for positioning is the potential loss of accuracy due to LOS path identification error in multipath environments. For example, the LOS path signal 606 may be degraded based on attenuation by a crop of trees 612, or other obstruction. Other non-LOS (NLOS) signals such as a first NLOS signal 608 and a second NLOS signal 610 may be received by the UE 604 with an increased signal strength as compared to the LOS path signal 606. The delay in the arrival times between the signals 606, 608, 610 is less detectable with a bandwidth limited receiver. Thus, the UE 604 may incorrectly indicate that the first NLOS signal 608, for example, is the LOS signal and subsequently utilize the incorrect timing information to generate an inaccurate position estimate.

Figures 7A, 7B:
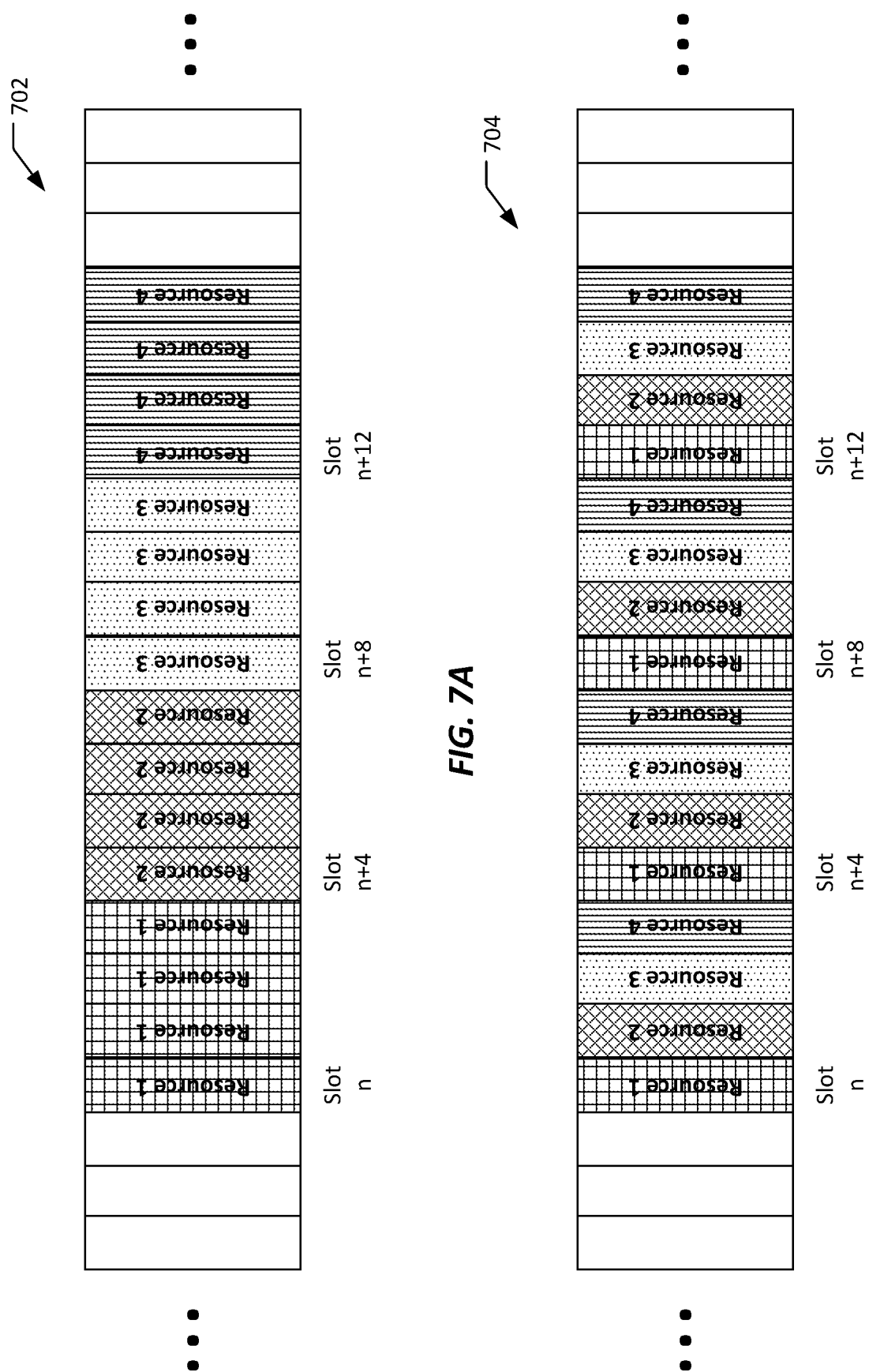
FIGS. 7A and 7B illustrates an example downlink positioning reference signal resource sets.

Referring to FIGS. 7A and 7B, an exemplary downlink PRS resource sets are shown. In general, a PRS resource set is a collection of PRS resources across one base station (e.g., base station 602) which have the same periodicity, a common muting pattern configuration and the same repetition factor across slots. A first PRS resource set 702 includes 4 resources and a repetition factor of 4, with a time-gap equal to 1 slot. A second PRS resource set 704 includes 4 resources and a repetition factor of 4 with a time-gap equal to 4 slots. The repetition factor indicates the number of times each PRS resource is repeated in each single instance of the PRS resource set (e.g., values of 1, 2, 4, 6, 8, 16, 32). The time-gap represents the offset in units of slots between two repeated instances of a PRS resource corresponding to the same PRS resource ID within a single instance of the PRS resource set (e.g., values of 1, 2, 4, 8, 16, 32). The time duration spanned by one PRS resource set containing repeated PRS resources does not exceed PRS-periodicity. The repetition of a PRS resource enables receiver beam sweeping across repetitions and combining RF gains to increase coverage. The repetition may also enable intra-instance muting.

Figure 8:
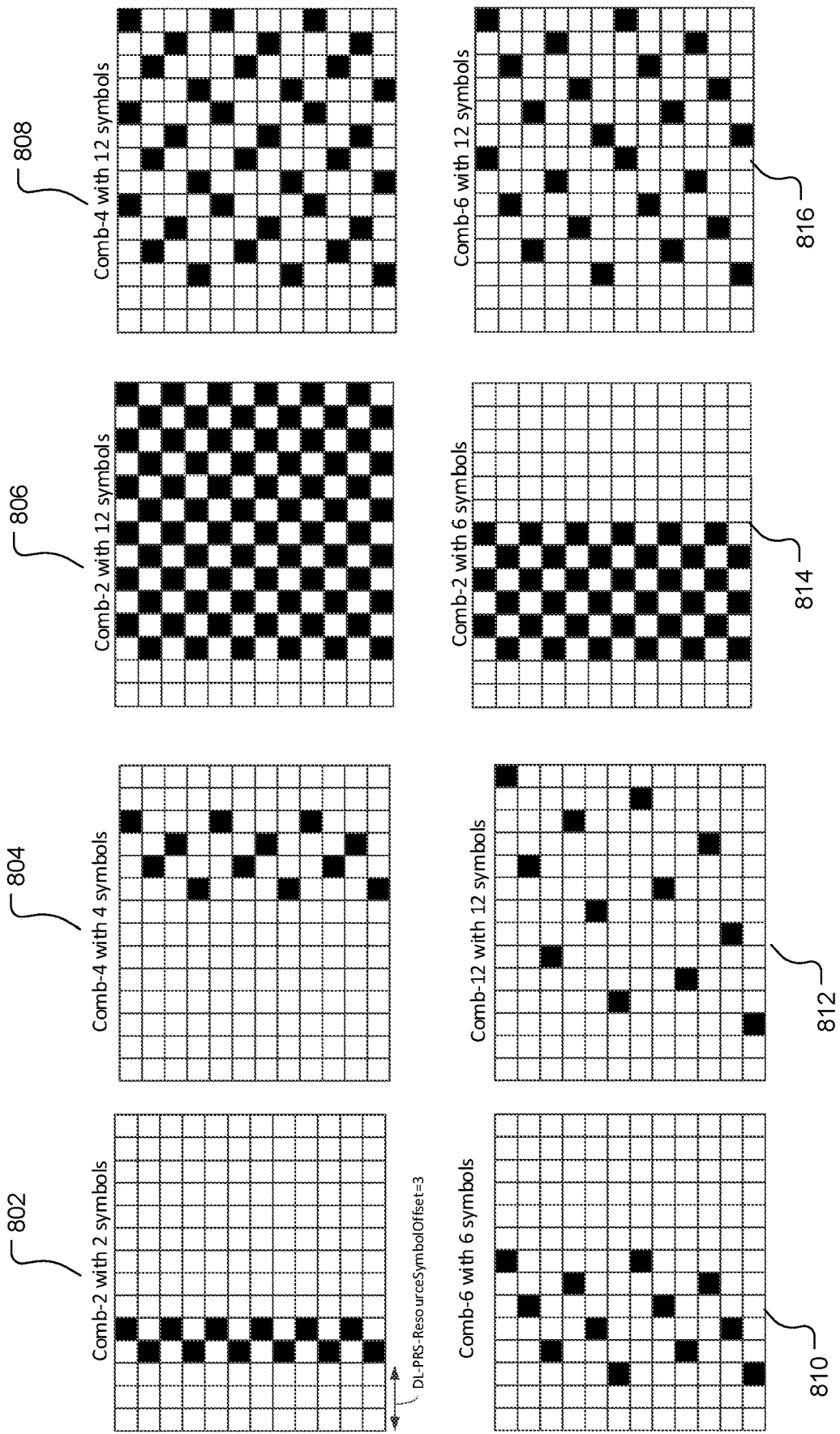
FIG. 8 is an illustration of example subframe formats for positioning reference signal transmission.

Referring to FIG. 8, example subframe and slot formats for positioning reference signal transmission are shown. The example subframe and slot formats are included in the PRS resource sets depicted in FIGS. 7A and 7B. The subframes and slot formats in FIG. 8 are examples and not limitations and include a comb-2 with 2 symbols format 802, a comb-4 with 4 symbols format 804, a comb-2 with 12 symbols format 806, a comb-4 with 12 symbols format 808, a comb-6 with 6 symbols format 810, a comb-12 with 12 symbols format 812, a comb-2 with 6 symbols format 814, and a comb-6 with 12 symbols format 816. In general, a subframe may include 14 symbol periods with indices 0 to 13. The subframe and slot formats may be used for a Physical Broadcast Channel (PBCH). Typically, a base station may transmit the PRS from antenna port 6 on one or more slots in each subframe configured for PRS transmission. The base station may avoid transmitting the PRS on resource elements allocated to the PBCH, a primary synchronization signal (PSS), or a secondary synchronization signal (SSS) regardless of their antenna ports. The cell may generate reference symbols for the PRS based on a cell ID, a symbol period index, and a slot index. Generally, a UE may be able to distinguish the PRS from different cells.

A base station may transmit the PRS over a particular PRS bandwidth, which may be configured by higher layers. The base station may transmit the PRS on subcarriers spaced apart across the PRS bandwidth. The base station may also transmit the PRS based on the parameters such as PRS periodicity $T_{PRS}$, subframe offset $\Delta_{PRS}$, and PRS duration $N_{PRS}$. PRS periodicity is the periodicity at which the PRS is transmitted. The PRS periodicity may be, for example, 160, 320, 640 or 1280 ms. Subframe offset indicates specific subframes in which the PRS is transmitted. And PRS duration indicates the number of consecutive subframes in which the PRS is transmitted in each period of PRS transmission (PRS occasion). The PRS duration may be, for example, 1, 2, 4 or 6 ms.

The PRS periodicity $T_{PRS}$ and the subframe offset $\Delta_{PRS}$ may be conveyed via a PRS configuration index $I_{PRS}$. The PRS configuration index and the PRS duration may be configured independently by higher layers. A set of $N_{PRS}$ consecutive subframes in which the PRS is transmitted may be referred to as a PRS occasion. Each PRS occasion may be enabled or muted, for example, the UE may apply a muting bit to each cell. As will be discussed, a muting pattern may apply to PRS transmissions in full duplex slots. A PRS resource set is a collection of PRS resources across a base station which have the same periodicity, a common muting pattern configuration, and the same repetition factor across slots (e.g., 1, 2, 4, 6, 8, 16, 32 slots).

In general, the PRS resource described in FIG. 6 may be a collection of resource elements that are used for transmission of PRS. The collection of resource elements can span multiple physical resource blocks (PRBs) in the frequency domain and N (e.g., 1 or more) consecutive symbol(s) within a slot in the time domain. In a given OFDM symbol, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). Frequency hopping information as described herein may be included in the PRS resource. Currently, one antenna port is supported. The comb size indicates the number of subcarriers in each symbol carrying PRS. For example, a comb-size of comb-4 means that every fourth subcarrier of a given symbol carries PRS.

A PRS resource set is a set of PRS resources used for the transmission of PRS signals, where each PRS resource has a PRS resource ID. In addition, the PRS resources in a PRS resource set are associated with the same transmission-reception point (TRP). A PRS resource set is identified by a PRS resource set ID and may be associated with a particular TRP (identified by a cell ID) transmitted by an antenna panel of a base station. A PRS resource ID in a PRS resource set is associated with a single beam (and/or beam ID) transmitted from a single base station (where a base station may transmit one or more beams). As depicted in FIG. 6, each PRS resource of a PRS resource set may be transmitted on a different beam (e.g., 603a-d), and as such, a PRS resource, or simply resource can also be referred to as a beam. Note that this does not have any implications on whether the base stations and the beams on which PRS are transmitted are known to the UE.

A PRS occasion is one instance of a periodically repeated time window (e.g., a group of one or more consecutive slots) where PRS are expected to be transmitted. A PRS occasion may also be referred to as a PRS positioning occasion, a positioning occasion, or simply an occasion.

Note that the terms positioning reference signal and PRS are reference signals that can be used for positioning, such as but not limited to, PRS signals in LTE, navigation reference signals (NRS) in 5G, downlink position reference signals (DL-PRS), uplink position reference signals (UL-PRS), tracking reference signals (TRS), cell-specific reference signals (CRS), channel state information reference signals (CSI-RS), primary synchronization signals (PSS), secondary synchronization signals (SSS), sounding reference signals (SRS), etc.

In an example, a positioning frequency layer may be a collection of PRS resource sets across one or more base stations. The positioning frequency layer may have the same subcarrier spacing (SCS) and cyclic prefix (CP) type, the same point-A, the same value of PRS bandwidth, the same start PRB, and the same value of comb-size. The numerologies supported for PDSCH are supported for PRS.

Figure 9:
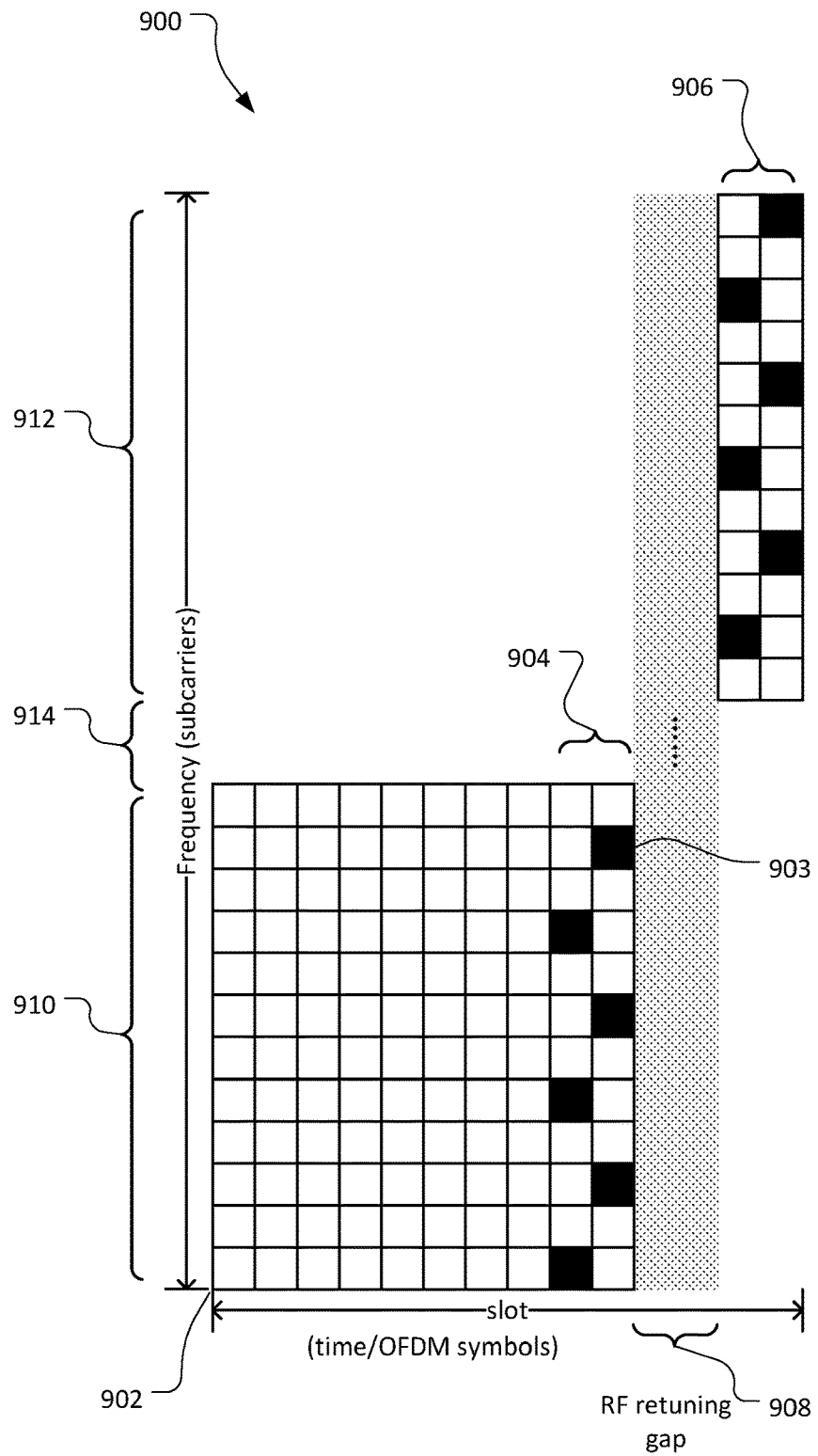
FIG. 9 is an example narrowband positioning reference signal with intra-PRS resource frequency hopping.

Referring to FIG. 9, with further reference to FIG. 8, an example narrowband positioning reference signal 900 with intra-PRS resource frequency hopping is shown. The PRS 900 illustrates a single PRB 902 with 12 Resource Elements 903 to simplify the explanation. A resource element 903 represents one subcarrier in the frequency domain and one OFDM symbol in the time domain. In operation, the PRS 900 may include additional resource blocks spanning additional subcarriers. The PRS 900 may be based on a PRS resource in a PRS resource set stored on a base station or other network server 400. The resource block 902 is an example of a comb-4 with 4 symbols format 804 with intra-PRS resource frequency hopping. Other resource blocks, such as depicted in FIG. 8, may be used. The PRS 900 includes a plurality of OFDM symbols based on the numerology of the associated radio access technology. For example, 5G NR systems typically include 14 symbols per slot. The PRS 900 includes a first set of symbols 904 in a first frequency range 910, a second set of symbols 906 in a second frequency range 912, and a retuning gap 908. The first and second sets of symbols 904, 906 include the resource elements 903 defined in the PRS resource. The first and second frequency ranges 910, 912 may be based on the capabilities of an NR-Light UE and may be in a range of approximately smaller than 10 MHz. Other frequency ranges may also be used. A frequency gap 914 may be based on the subcarrier spacing of the radio access technology. Typically, for a network with 15 kHz SCS, the retuning gap 908 may have a length of 1 or 2 symbols to allow time for the UE to retune to the appropriate frequency range. The retuning gap 908 may be larger (i.e., 4, 8, 10, 20 symbols, etc.) for higher frequency applications where the SCS is increased (e.g., 60/120 kHz). The size of the frequency gap 914 may also impact the size of the retuning gap 908. In general, to reduce cross-correlation sidelobes of a PRS transmission (e.g., beam) the size of the frequency gap 914 may be maintained within a few subcarriers (e.g., 1, 2, 5, 6, 10 times the SCS). The sizes of the retuning gap 908 and the frequency gap 914 may vary based on the capabilities of the network and the bandwidth requirements of the UEs.

Figure 10:
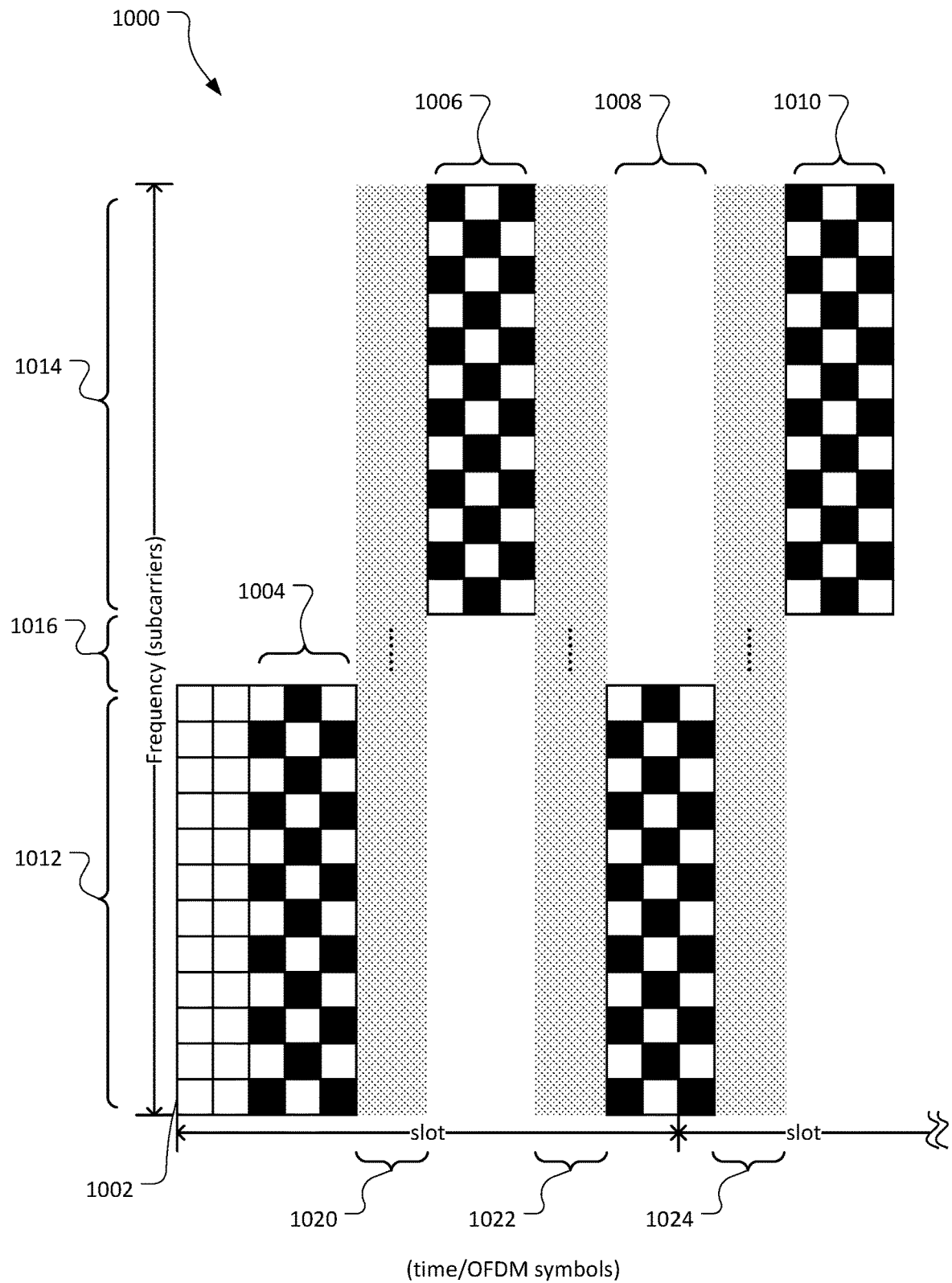
FIG. 10 is an example narrowband positioning reference signal spanning two slots with intra-PRS resource frequency hopping.

Referring to FIG. 10, with further reference to FIGS. 8 and 9, an example narrowband PRS 1000 spanning two slots with intra-PRS frequency hopping is shown. The PRS 1000 illustrates a single PRB 1002 with 12 Resource Elements to simplify the explanation. In operation, the PRS 1000 may include additional resource blocks spanning additional subcarriers. The PRS 1000 may be based on a PRS resource in a PRS resource set stored on a base station or other network server 400. The resource block 1002 is an example of a comb-2 with 12 symbols format 806 with intra-PRS resource frequency hopping. Other resource blocks, such as depicted in FIG. 8, may be used. A first set of symbols 1004 may occupy a first frequency range 1012 and a second set of symbols 1006 may occupy a second frequency range 1014. A third set of symbols 1008 may occupy the first frequency range 1012 and may extend into an adjacent slot in the radio frame. A fourth set of symbols 1010 may occupy the second frequency range 1014 in the second slot. A first retuning gap 1020 may be between the first and second sets of symbols 1004, 1006, a second retuning gap 1022 may be between the second and third sets of symbols 1006, 1008, and a third retuning gap 1024 may be between the third and four sets of symbols 1008, 1010. The first and second frequency ranges 1012, 1014 may be separated by a frequency gap 1016. The number of symbols in the sets of symbols 1004, 1006, 1008, 1010 are examples only and not limitations. The PRS 1000 illustrates that one PRS resource with frequency hopping may span over two or more slots. In particular, the additional slots may be required to accommodate extended retuning gaps 1020, 1022, 1024 associated with larger SCS in the physical layer. For example, referring to FIG. 9, the single retuning gap 908 may be large enough to extend some or all of the second set of symbols 906 into an adjacent slot.

Figure 11A:
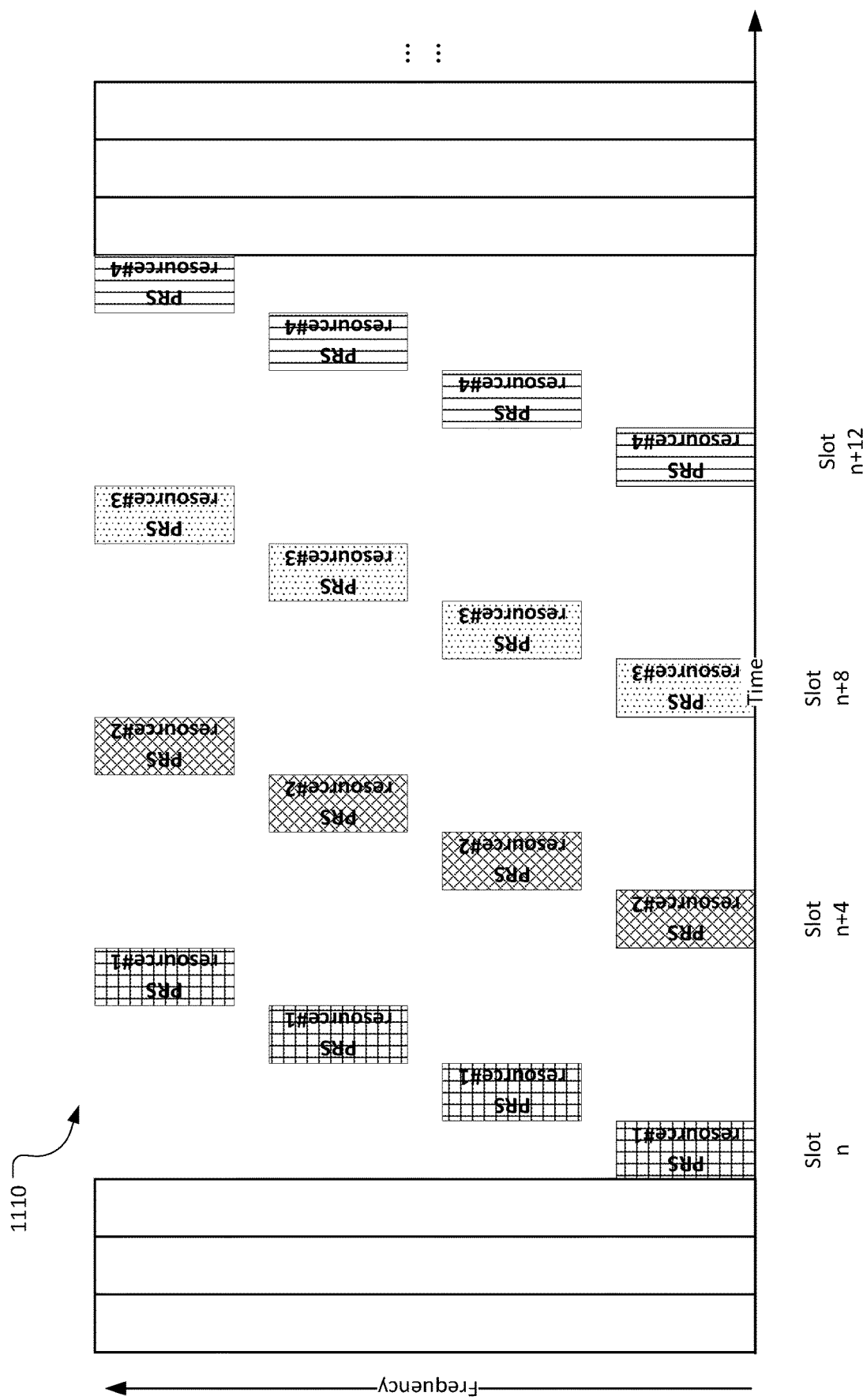
FIGS. 11A-11D are examples of narrowband positioning reference signals with inter-PRS resource frequency hopping.

Referring to FIGS. 11A-11D, examples of narrowband position reference signal with inter-PRS resource frequency hopping are shown. The PRS resources depicted in FIGS. 11A-11D may be part of a PRS resource set on a base station, such as the base station 602. In operation, the signaling to associate a PRS resource to multiple frequency locations for frequency hopping may be that the PRS resource set, or a PRS resource, is associated with two or more positioning frequency layers. PRS resource information may be provide to a UE as assistance data included in positioning messages, such as New Radio Position Protocol (NRPP) messages, or other messages which may be defined in 3GPP Technical Specification (TS) 38.455. In an example, the PRS resource information may be included in System Information Blocks (SIBs) as part of the RRC messaging. Referring to FIG. 11A, a first example PRS resource set 1110 includes four PRS resources with a resource repetition factor of four and a resource time gap value of one. In an example, the PRS resource set 1110 utilizes four frequency locations, but fewer or additional frequency locations may be used. As depicted, a first PRS resource (PRS resource #1) is transmitted in four different slots and four different frequency ranges. The time interval between two consecutive hops may be based on a tuning gap associated with the SCS. A receiving UE may complete the measurements corresponding to one PRS resource (e.g., one of beams 603a-d) in four consecutive slots. The first example PRS resource set 1100 also includes a second PRS resource (PRS resource #2), a third PRS resource (PRS resource #3), and a fourth PRS resource (PRS resource #4) which have common frequency locations with the first PRS resource (PRS resource #1).

Figure 11B:
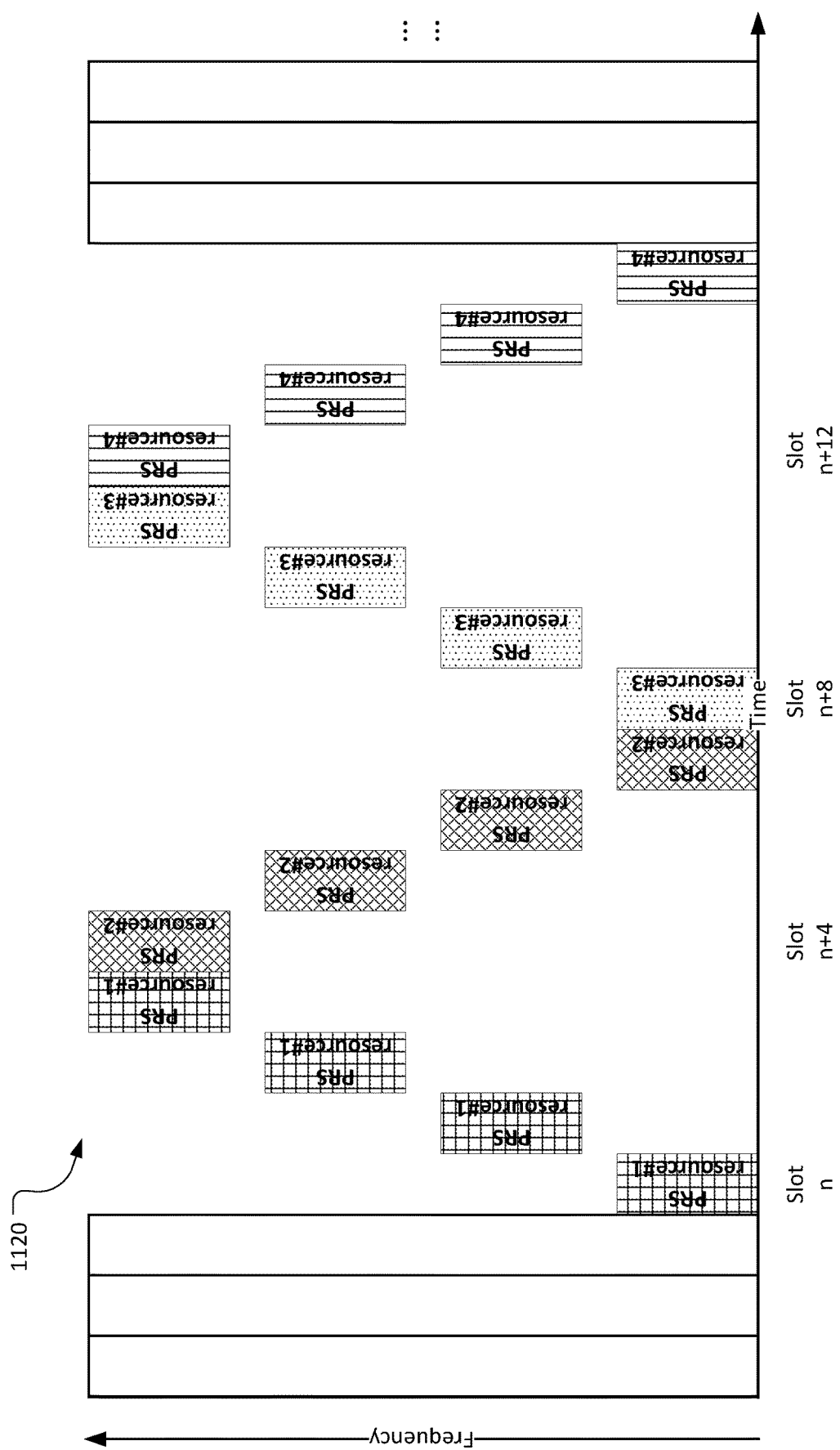

FIG. 11B depicts a second example PRS resource set 1120 including four resources and a resource repetition factor of four and a resource time gap value of one. In an example, the PRS resource set 1120 utilizes four frequency locations, but fewer or additional frequency locations may be used. In this PRS resource set, the tuning gaps are eliminated between PRS resource #1 and PRS resource #2 (i.e., slot n+4), between PRS resource #2 and PRS resource #3 (i.e., slot n+8), and PRS resource #3 and PRS resource #4 (i.e., slot n+12) because the respective slots utilize the previous frequency of the previous PRS resource. In operation, the second example PRS resource set 1120 provides an advantage of reduced RF retuning time when the UE is measuring across the PRS resources in the set.

Figure 11C:
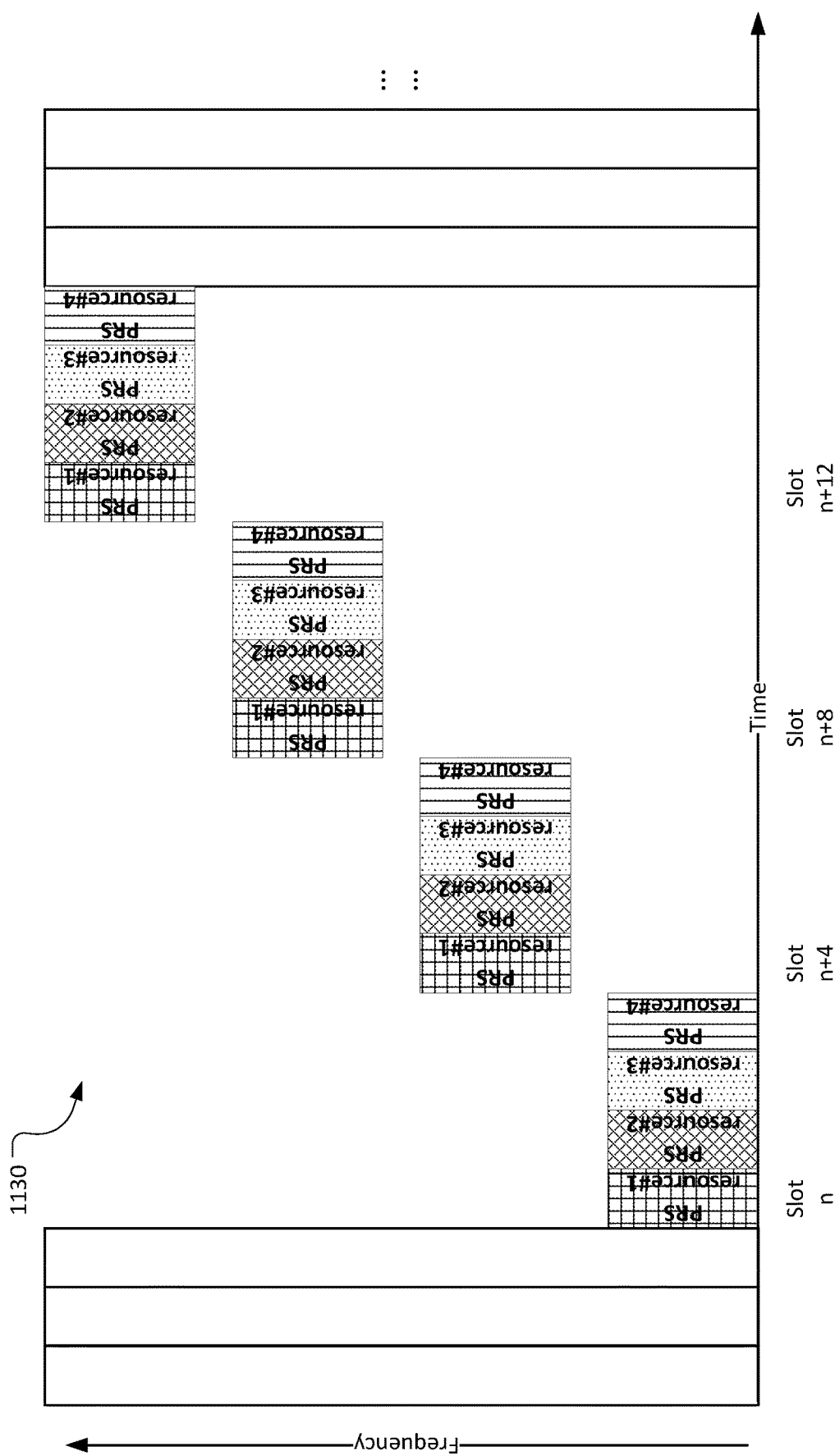

FIG. 11C depicts a third example PRS resource set 1130 including four resources and a resource repetition factor of four and a resource time gap value of four. In an example, the PRS resource set 1130 utilizes four frequency locations, but fewer or additional frequency locations may be used. As depicted, a first portion of each of the PRS resources #1-#4 are transmitted in a first frequency position, and the subsequent portions are similarly transmitted in three additional frequency locations. A benefit of the PRS resource set 1130 is that a UE may have more time to adjust a receive beam for one of the PRS resources (i.e., transmit beams) because the repetitions of one PRS resources occur at a larger time interval. For example, PRS resource #1 is acquired at slot n, slot n+4, slot n+8 and slot n+12.

Figure 11D:
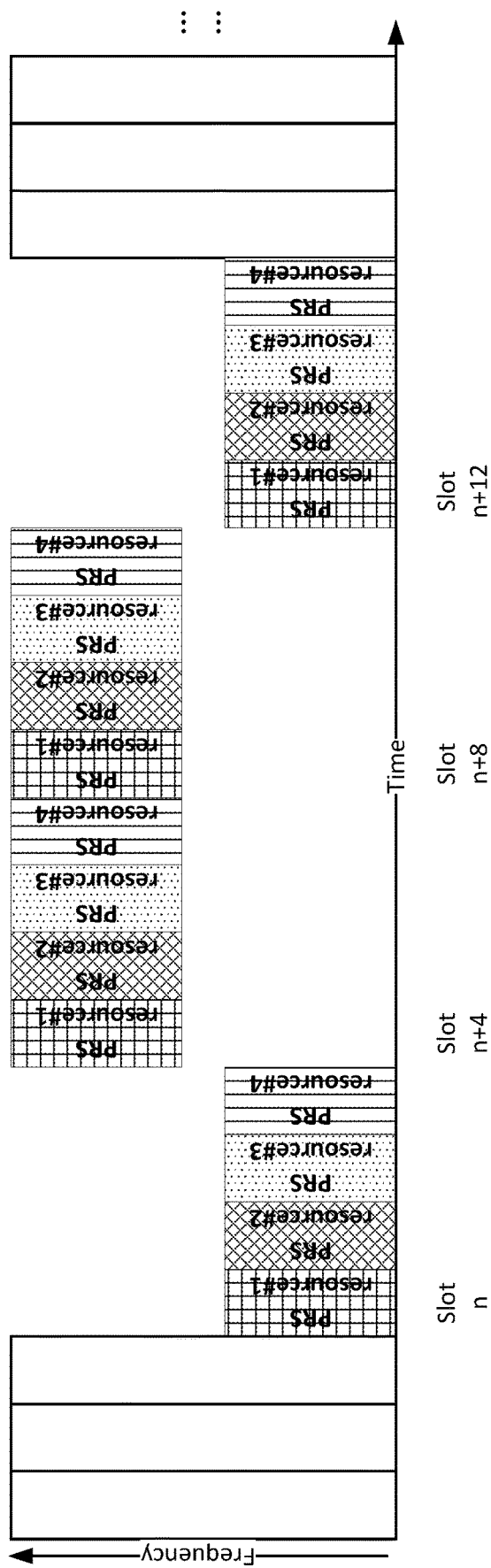

FIG. 11D depicts a fourth example PRS resource set 1140 including four resources and a resource repetition factor of four and a resource time gap value of four. In an example, the PRS resource set 1140 utilizes two frequency locations, but additional frequency locations may be used. As depicted, a first portion of each of the PRS resources #1-#4 are transmitted in a first frequency position, and the subsequent portions are similarly transmitted in a second additional frequency location, and then back to the first frequency location. In operation, with only two frequency locations, a benefit of setting the frequency offset between the hop of slot (n+8)-to-(n+11) and (n+12)-to-(n+16), opposite to the frequency offset between the hop of slot (n)-to-(n+3) and (n+4)-to-(n+7) is to reduce the RF retuning, as well as improving a frequency offset estimation by the UE receiver chain. In an example, an upper frequency of a first frequency range (e.g., slot n) and a lower frequency in a second frequency range (e.g., slot n+1) are within a SCS value of one another.

Figure 12:
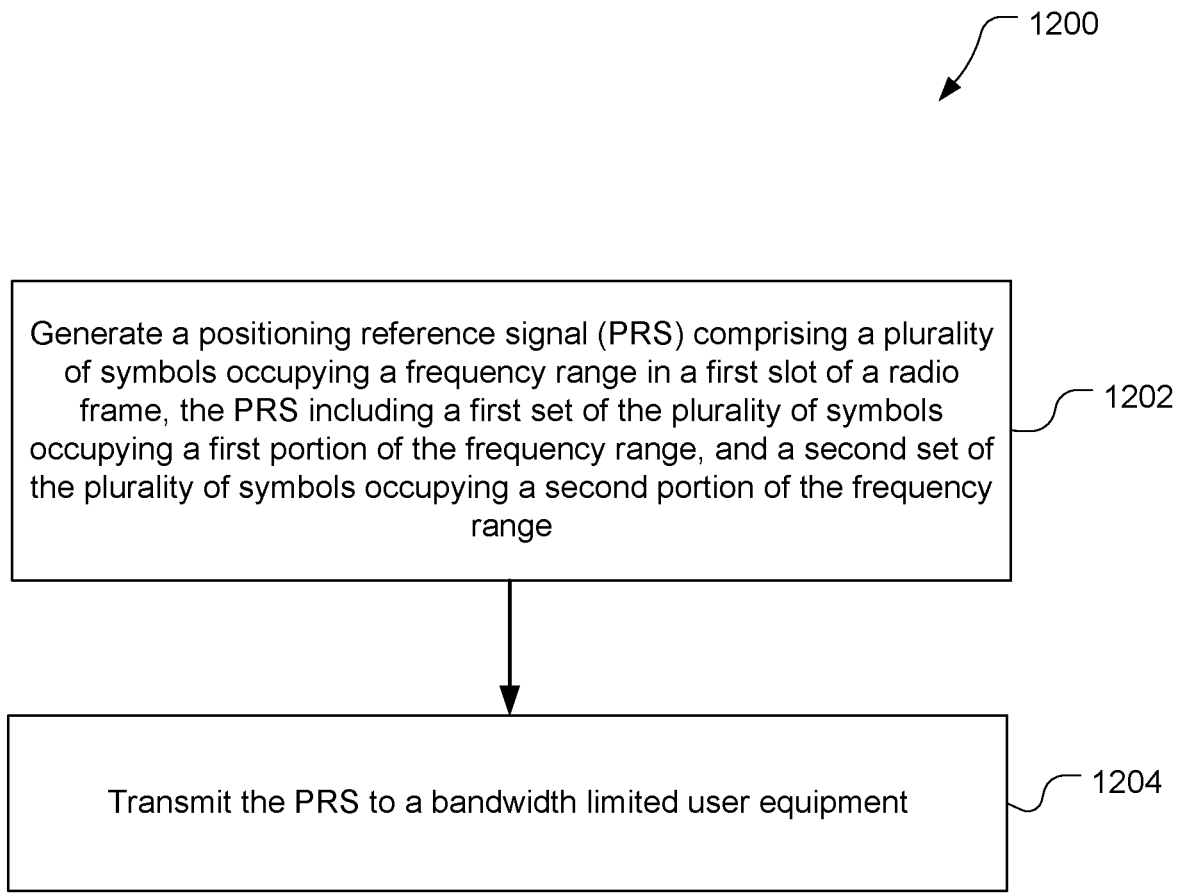
FIG. 12 is a process flow diagram of an example method for providing positioning reference signals with intra-PRS resource frequency hopping to a bandwidth limited user equipment.

Referring to FIG. 12, with further reference to FIGS. 1-11D, a method 1200 for providing positioning reference signals with intra-PRS resource frequency hopping to a bandwidth limited user equipment includes the stages shown. The method 1200 is, however, an example only and not limiting. The method 1200 may be altered, e.g., by having stages added, removed, rearranged, combined, performed concurrently, and/or having single stages split into multiple stages.

At stage 1202, the method includes generating a positioning reference signal (PRS) comprising a plurality of symbols occupying a frequency range in a first slot of a radio frame, the PRS including a first set of the plurality of symbols occupying a first portion of the frequency range, and a second set of the plurality of symbols occupying a second portion of the frequency range. A base station 102 or a server 400 are a means for generating the PRS. The PRS may be based on parameters in a PRS resource set and/or PRS resource object stored in a memory device in the base station 102 or other networked device (e.g., location server 230, LMF 270). A PRS resource may be a collection of resource elements that are used for transmission of the PRS. The collection of resource elements can span multiple PRBs in the frequency domain and N (e.g., 1 or more) consecutive symbol(s) within a slot in the time domain. In an example, referring to FIG. 9, the PRS 900 includes a first set of symbols 904 in a first frequency range 910, and a second set of symbols 906 in a second frequency range 912. The first and second sets of symbols 904, 906 include the resource elements 903 defined in a PRS resource. The PRS may include a retuning gap 908 between the first set of the plurality of symbols and the second set of the plurality of symbols. In an example, the first set of symbols 904 and the second set of symbols 906 are adjacent (i.e., consecutive symbols). In other examples, the length of the retuning gap 908 may be 1 or 2 symbols when the SCS is 15 kHz. The retuning gap 908 may be larger for larger SCS values (e.g., 60/120 kHz SCS values). The size of the retuning gap 908 may cause the PRS to extend into an adjacent slot. A frequency gap 914 between the first frequency range 910 and the second frequency range 912 may be based on the SCS. In general, the frequency gap 914 may be determined to reduce the impact of cross-correlation sidelobes in the frequency domain.

In an embodiment, referring to FIG. 10, a PRS resource may have multiple sets of symbols. For example, the method 1200 may include a third set of the plurality of symbols 1008 occupying the first frequency range 1012, and a fourth set of the plurality of symbols 1010 occupying the second frequency range 1014. Addition sets of symbols and frequency ranges may also be used. Retuning gaps, such as the second retuning gap 1022, and the third retuning gap 1024 may be utilized between the symbol sets.

At stage 1204, the method includes transmitting the PRS to a bandwidth limited user equipment. The base station 102 and the wireless transceiver 440 are a means for transmitting the PRS. The PRS enables a bandwidth limited UE, such a NR-Light UE 604 to obtain RSTD measurement information (e.g., timing information) such as described in 3GPP TS 36.211. In an example, the PRS resource may be based on beam forming technology and the PRS may be associated with a beam direction such as one of the beams 603a-d in FIG. 6.

Figure 13:
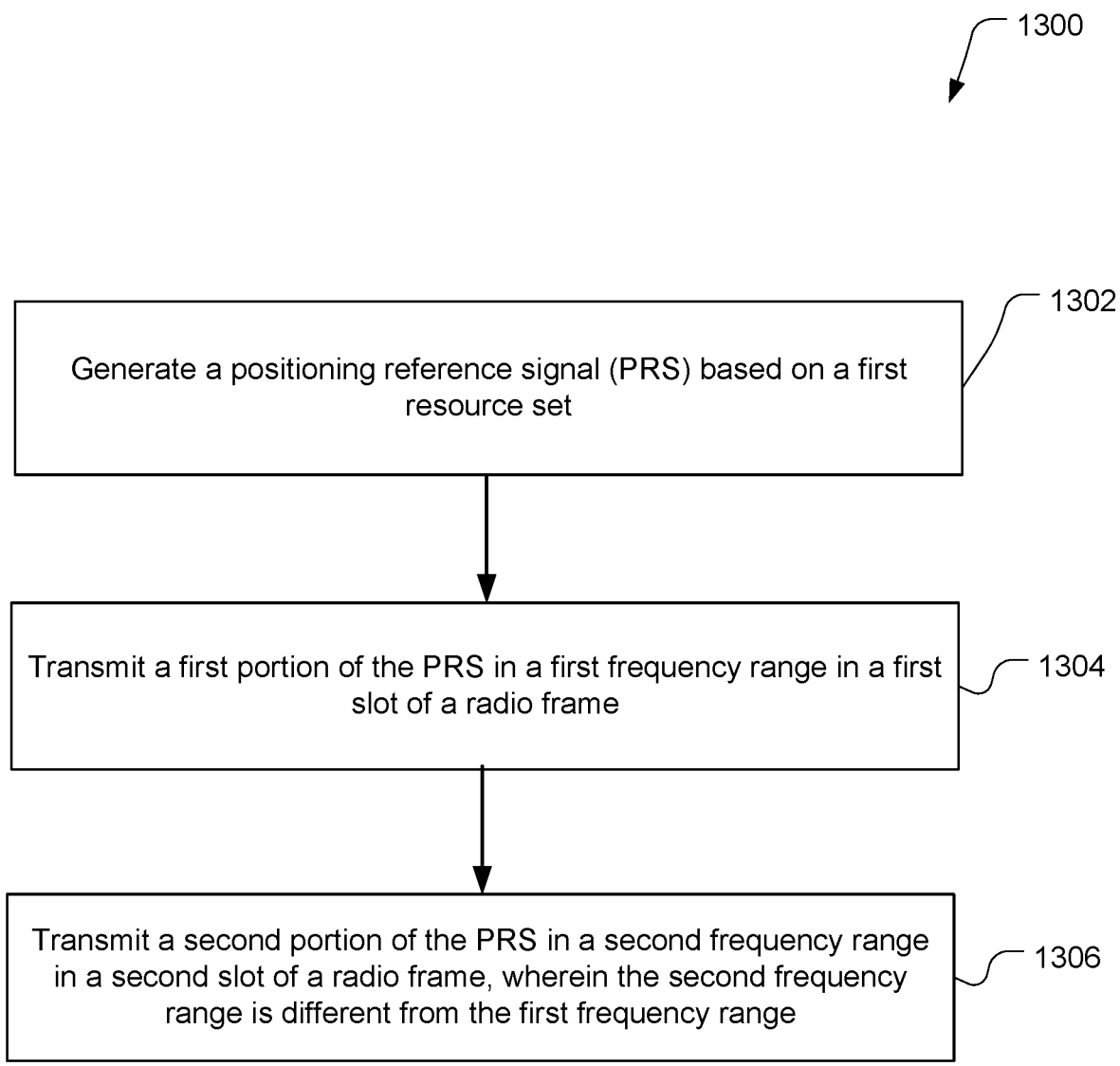
FIG. 13 is a process flow diagram of an example method for providing positioning reference signals with inter-PRS resource frequency hopping to a bandwidth limited user equipment.

Referring to FIG. 13, with further reference to FIGS. 1-11D, a method 1300 for providing positioning reference signals with inter-PRS resource frequency hopping to a bandwidth limited user equipment includes the stages shown. The method 1300 is, however, an example only and not limiting. The method 1300 may be altered, e.g., by having stages added, removed, rearranged, combined, performed concurrently, and/or having single stages split into multiple stages.

At stage 1302, the method includes generating a positioning reference signal (PRS) based on a first resource set. The base station 102 or server 400 are means for generating the PRS. The PRS may include several PRBs and extend along the frequency domain such that the beam width of the PRS is greater than 10 or 20 MHz. The band width of the PRS may exceed the capabilities of an NR-Light UE. The base station 102 may utilize frequency hopping to divide the PRS into smaller portions which meet the band width requirements of reduce capability UEs. A PRS resource set and/or PRS resource object may be stored in a memory device in the base station 102 or other networked device (e.g., location server 230, LMF 270).

At stage 1304, the method includes transmitting a first portion of the PRS in a first frequency range in a first slot of a radio frame. The base station 102 is a means for transmitting the first portion of the PRS. Referring to FIGS. 11A-11D, in an example, the PRS resource set 1110 utilizes four frequency locations, but fewer or additional frequency locations may be used. As depicted, a first PRS resource (e.g., PRS resource #1) is transmitted in four different slots and four different frequency ranges. The first portion of the PRS comprises the symbols in the PRS Resource #1 transmission in slot n.

At stage 1306, the method includes transmitting a second portion of the PRS in a second frequency range in a second slot of the radio frame, wherein the second frequency range is different from the first frequency range. The base station 102 is a means for transmitting the second portion of the PRS. Referring again to the PRS resource set 1110, a second portion of the PRS resource #1 is transmitted in slot n+1 in a higher frequency range than the first portion of the PRS transmitted at slot n. The number of portions and frequency ranges are examples only. FIGS. 11A-11D provide examples including using four slots for each of the PRS resources but fewer or additional slots and frequency ranges may be used. The transmission of one PRS resource may be interleaved with transmissions for other PRS resources. The time interval between the transmitting of two portions (e.g., between slot n and slot n+1) may be based on a tuning gap associated with the SCS.

Figure 14:
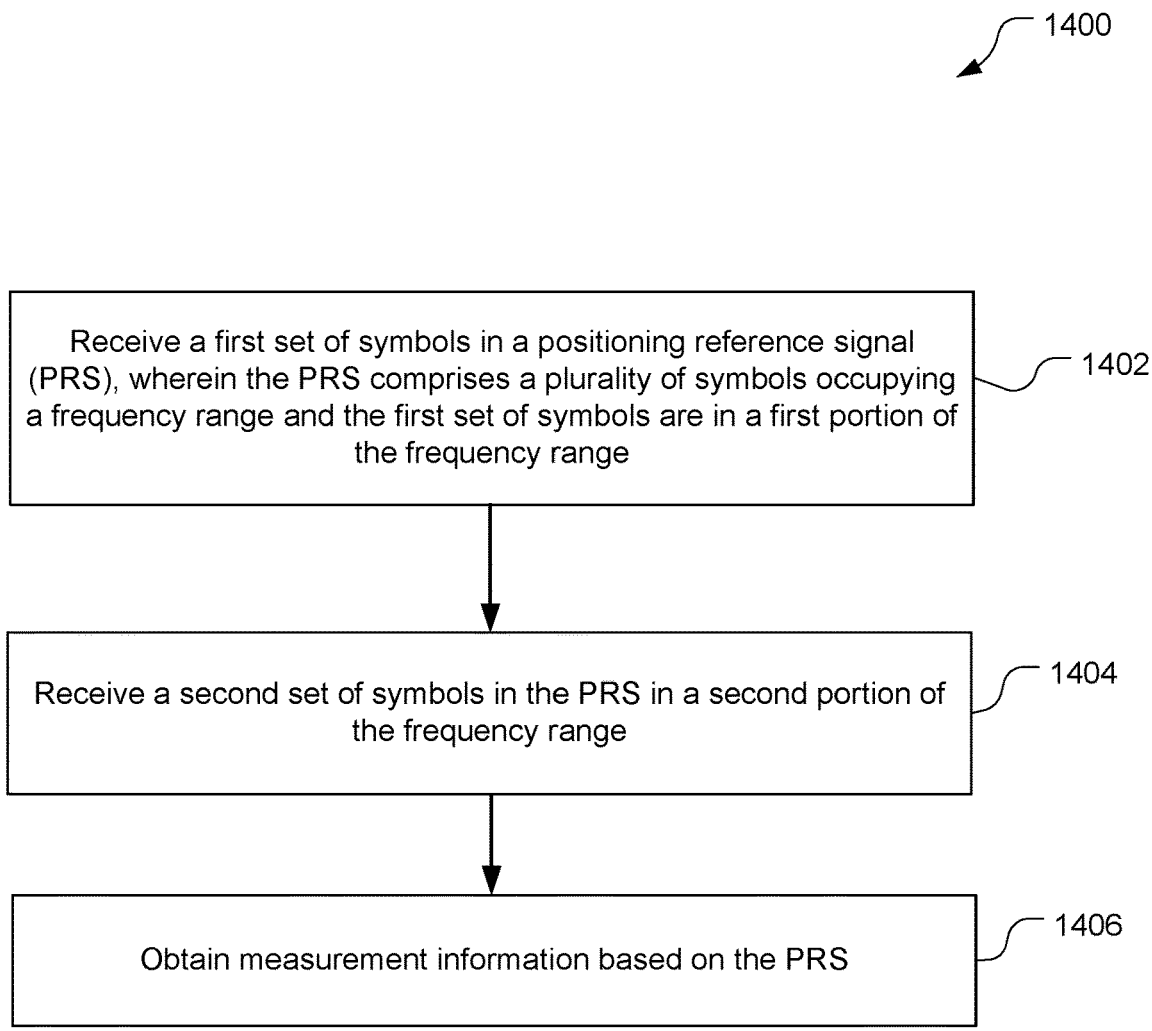
FIG. 14 is a process flow diagram of an example method for receiving positioning reference signals with intra-PRS resource frequency hopping with a bandwidth limited user equipment.

Referring to FIG. 14, with further reference to FIGS. 1-11D, a method 1400 for receiving positioning reference signals with intra-PRS resource frequency hopping with a bandwidth limited user equipment includes the stages shown. The method 1400 is, however, an example only and not limiting. The method 1400 may be altered, e.g., by having stages added, removed, rearranged, combined, performed concurrently, and/or having single stages split into multiple stages.

At stage 1402, the method includes receiving a first set of symbols in a positioning reference signal (PRS), wherein the PRS comprises a plurality of symbols occupying a frequency range and the first set of symbols are in a first portion of the frequency range. A UE 300 and the transceiver 315 are a means for receiving the first set of symbols. The UE may be a bandwidth limited UE such as a NR-Light UE. In an example, referring to FIG. 9, the PRS 900 includes a first set of symbols 904 in a first frequency range 910, and a second set of symbols 906 in a second frequency range 912. The first and second sets of symbols 904, 906 include the resource elements 903 defined in a PRS resource. The UE 300 is configured to receive the first set of symbols 904 in the first frequency range 910. The received symbols may be processed and stored in the memory 311 to be further processed with additional symbols received in subsequent stages.

At stage 1404, the method includes receiving a second set of the symbols in the PRS in a second portion of the frequency range. The UE 300 and the transceiver 315 are means for receiving the second set of symbols. The UE 300 may be configured to retune the wireless transceiver 340 to receive the second set of symbols 906 in the second frequency range 912. The received symbols may be processed and stored in the memory 311 to be further processed with additional symbols received in subsequent stages if required. The PRS may include a retuning gap 908 to allow for the retuning of the transceiver 340 to complete before receiving the second set of symbols 906. In an example, the first set of symbols 904 and the second set of symbols 906 are consecutive (i.e., no retuning time). In other examples, the length of the retuning gap 908 may be 1 or 2 symbols when the SCS is 15 kHz. The retuning gap 908 may be larger for larger SCS values (e.g., 60/120 kHz SCS values). The size of the retuning gap 908 may cause the PRS to extend into an adjacent slot. In an embodiment, referring to FIG. 10, a PRS resource may have multiple sets of symbols. For example, the method 1200 may include a third set of symbols 1008 occupying the first frequency range 1012, and a fourth set of symbols 1010 occupying the second frequency range 1014. Additional sets of symbols and frequency ranges may also be used. Retuning gaps, such as the second retuning gap 1022, and the third retuning gap 1024 may be utilized between the symbol sets.

At stage 1406, the method includes obtaining measurement information based on the PRS. The UE 300 is a means for obtaining the measurements. A NR-Light UE may be configured to utilize the PRS to perform RSTD measurements. The PRS enables timing (i.e., ranging) measurements of a UE from base station signals to utilize OTDOA position estimates. In an example, the measurement information is the timing information associated with the PRS.

Figure 15:
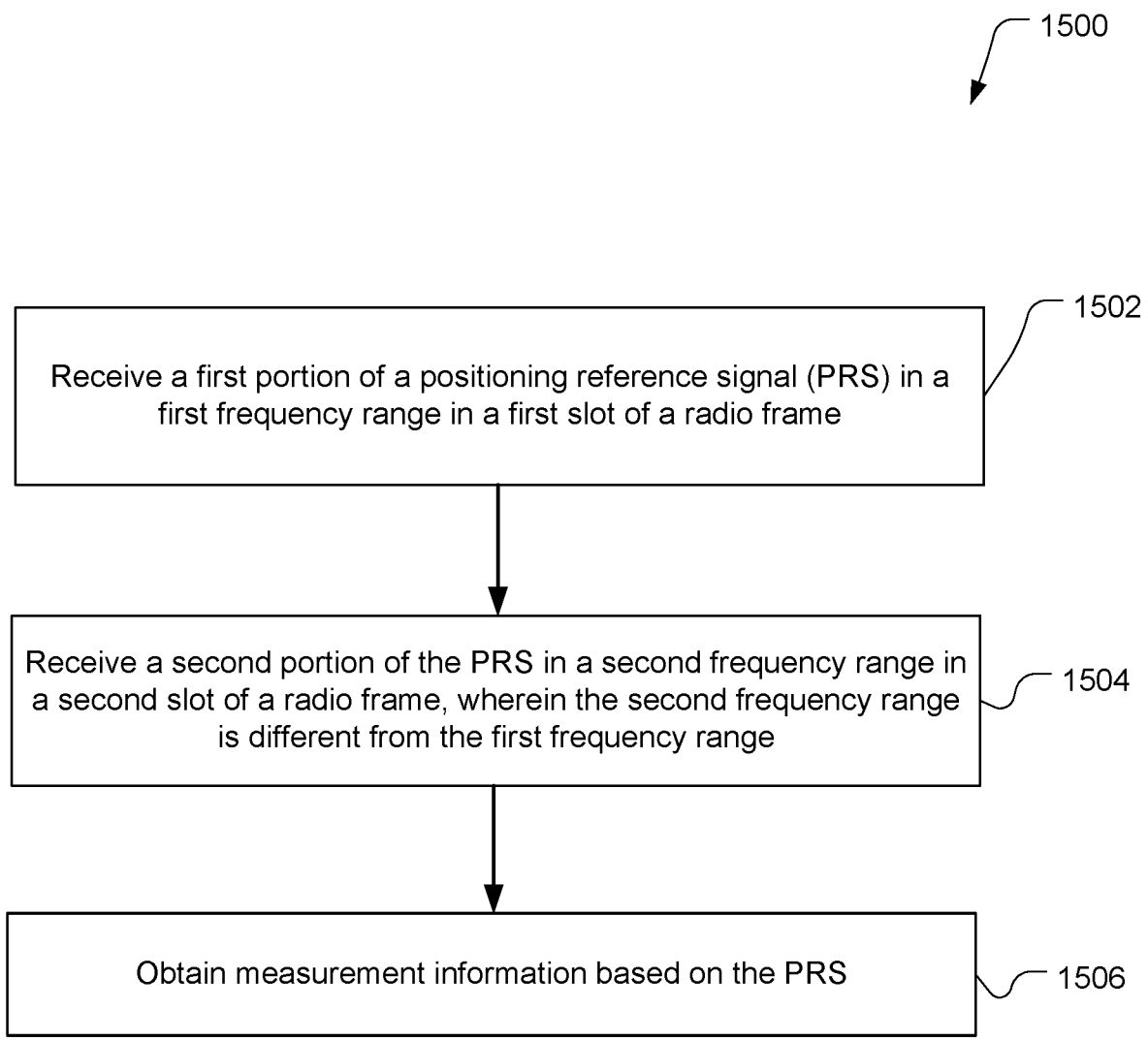
FIG. 15 is a process flow diagram of an example method for receiving positioning reference signals with inter-PRS resource frequency hopping with a bandwidth limited user equipment.

Referring to FIG. 15, with further reference to FIGS. 1-11D, a method 1500 for receiving positioning reference signals with inter-PRS resource frequency hopping with a bandwidth limited user equipment includes the stages shown. The method 1500 is, however, an example only and not limiting. The method 1500 may be altered, e.g., by having stages added, removed, rearranged, combined, performed concurrently, and/or having single stages split into multiple stages.

At stage 1502, the method includes receiving a first portion of a positioning reference signal (PRS) in a first frequency range in a first slot of a radio frame. The UE 300 and the transceiver 315 are a means for receiving the first portion of the PRS. Referring to FIGS. 11A-11D, in an example, the PRS resource set 1110 utilizes four frequency locations, but fewer or additional frequency locations may be used. As depicted, a first PRS resource (e.g., PRS resource #1) is transmitted in four different slots and four different frequency ranges. The UE 300, such as the NR-Light UE 604, is configured to receive a portion of the PRS comprising the symbols in the PRS Resource #1 transmission in slot n.

At stage 1504, the method includes receiving a second portion of the PRS in a second frequency range in a second slot of the radio frame, wherein the second frequency range is different from the first frequency range. The UE 300 and the transceiver 315 are means for receiving the second portion or the PRS. Referring again to the PRS resource set 1110, a second portion of the PRS resource #1 is transmitted in slot n+1 in a higher frequency range than the first portion of the PRS transmitted at slot n. The NR-Light UE 604 may be configured to retune the transceiver to receive PRS resource #1 transmitted in slot n+1 in the second frequency range. The number of portions and frequency ranges are examples only. The NR-Light UE may be configured to receive fewer or additional PRS resource slots such as depicted in FIGS. 11A-11D. The time interval between the transmitting of two portions (e.g., between slot n and slot n+1) may be based on a tuning gap associated with the SCS.

At stage 1506, the method includes obtaining measurement information based on the PRS. The UE 300 is a means for obtaining the measurements. A NR-Light UE may be configured to utilize the PRS to perform RSTD measurements. The PRS enables timing (i.e., ranging) measurements of a UE from base station signals to utilize OTDOA position estimates. In an example, the measurement information is the timing information associated with the PRS.

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

Also, as used herein, "or" as used in a list of items prefaced by "at least one of" or prefaced by "one or more of" indicates a disjunctive list such that, for example, a list of "at least one of A, B, or C," or a list of "one or more of A, B, or C," or "A, B, or C, or a combination thereof" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

A wireless communication system is one in which at least some communications are conveyed wirelessly, e.g., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, some operations may be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform one or more of the described tasks.

Components, functional or otherwise, shown in the figures and/or discussed herein as being connected, coupled (e.g., communicatively coupled), or communicating with each other are operably coupled. That is, they may be directly or indirectly, wired and/or wirelessly, connected to enable signal transmission between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

"About" and/or "approximately" as used herein when referring to a measurable value such as an amount, a temporal duration, and the like, encompasses variations of ±20% or ±10%, ±5%, or +0.1% from the specified value, as appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Further, more than one invention may be disclosed.

What is claimed is:

1. A method for providing a positioning reference signal (PRS) to a bandwidth limited user equipment, comprising:
   generating a PRS comprising a plurality of symbols occupying a frequency range in a first slot of a radio frame, the PRS including:
   a first set of the plurality of symbols occupying a first portion of the frequency range;
   a second set of the plurality of symbols occupying a second portion of the frequency range, the first set of the plurality of symbols comprising different symbols than the second set of the plurality of symbols, and the first portion of the frequency range being non-overlapping in frequency with the second portion of the frequency range; and
   transmitting, from a base station, the PRS to the bandwidth limited user equipment.

2. The method of claim 1 wherein the PRS further includes a first retuning gap between the first set of the plurality of symbols and the second set of the plurality of symbols.

3. The method of claim 2 wherein a duration of the first retuning gap is based at least in part on a subcarrier spacing of the PRS.

4. The method of claim 3 wherein the duration of the first retuning gap is 1 or 2 symbols and the subcarrier spacing is 15 kHz.

5. The method of claim 1 wherein the PRS further includes:
   a third set of the plurality of symbols occupying the first portion of the frequency range; and
   a fourth set of the plurality of symbols occupying the second portion of the frequency range.

6. The method of claim 5 wherein the PRS further includes:
   a first retuning gap between the first set of the plurality of symbols and the second set of the plurality of symbols;
   a second retuning gap between the second set of the plurality of symbols and the third set of the plurality of symbols; and
   a third retuning gap between the third set of the plurality of symbols and the fourth set of the plurality of symbols.

7. The method of claim 1 wherein one or more of the plurality of symbols of the PRS occupies a second slot in the radio frame.

8. The method of claim 1 wherein the first portion of the frequency range is separated in frequency from the second portion of the frequency range by a frequency gap.

9. A method for providing a positioning reference signal (PRS) to a bandwidth limited user equipment, comprising:
   generating a PRS based on a first resource set;
   transmitting, from a base station, a first portion of the PRS in a first frequency range in a first slot of a radio frame; and
   transmitting, from the base station, a second portion of the PRS in a second frequency range in a second slot of the radio frame, wherein the second frequency range is different from, and non-overlapping with, the first frequency range.

10. The method of claim 9 further comprising delaying for a tuning gap after transmitting the first portion of the PRS and prior to transmitting the second portion of the PRS.

11. The method of claim 10 wherein a duration of the tuning gap is based at least in part on a subcarrier spacing of the PRS.

12. The method of claim 9 wherein the first slot and the second slot are adjacent slots in the radio frame.

13. The method of claim 9 further comprising:
   transmitting a third portion of the PRS in a third frequency range in a third slot of the radio frame; and
   transmitting a fourth portion of the PRS in a fourth frequency range in a fourth slot of the radio frame, wherein the third frequency range is different from the fourth frequency range.

14. The method of claim 13 wherein the second slot is adjacent to the first slot, the third slot is adjacent to the second slot, and the fourth slot is adjacent to the third slot.

15. The method of claim 9 further comprising:
   transmitting a third portion of the PRS in the second frequency range in a third slot of the radio frame; and
   transmitting a fourth portion of the PRS in the first frequency range in a fourth slot of the radio frame.

16. The method of claim 9 further comprising:
   generating a second PRS based on a second resource set;
   transmitting a first portion of the second PRS in the first frequency range in a third slot of the radio frame; and
   transmitting a second portion of the second PRS in the second frequency range in a fourth slot of the radio frame.

17. The method of claim 16 wherein transmitting the first portion of the second PRS occurs in a slot adjacent to a slot when the first portion of the PRS is transmitted, and there is no retuning gap between transmitting the first portion of the PRS and transmitting the first portion of the second PRS.

18. A method for facilitating the positioning of a bandwidth limited user equipment with a positioning reference signal (PRS), comprising:
receiving, at the bandwidth limited user equipment, a first portion of the PRS in a first frequency range in a first slot of a radio frame;
receiving, at the bandwidth limited user equipment, a second portion of the PRS in a second frequency range in a second slot of the radio frame, wherein the second frequency range is different from, and non-overlapping with, the first frequency range; and
obtaining, at the bandwidth limited user equipment, measurement information based on the PRS.

19. The method of claim 18 further comprising retuning a transceiver during a tuning gap prior to receiving the second portion of the PRS, wherein a duration of the tuning gap is based at least in part on a subcarrier spacing of the PRS.

20. The method of claim 18 further comprising:
receiving a third portion of the PRS in a third frequency range in a third slot of the radio frame; and
receiving a fourth portion of the PRS in a fourth frequency range in a fourth slot of the radio frame, wherein the third frequency range is different from the fourth frequency range.

21. The method of claim 18 further comprising:
receiving a third portion of the PRS in the second frequency range in a third slot of the radio frame; and
receiving a fourth portion of the PRS in the first frequency range in a fourth slot of the radio frame.

22. The method of claim 18 further comprising:
receiving a first portion of a second PRS in the first frequency range in a third slot of the radio frame, wherein the second PRS is based on a second resource set; and
receiving a second portion of the second PRS in the second frequency range in a fourth slot of the radio frame.

23. The method of claim 22 wherein receiving the first portion of the second PRS occurs in a slot adjacent to a slot when the first portion of the PRS is received, and there is no retuning gap between receiving the first portion of the PRS and receiving the first portion of the second PRS.

24. An apparatus for facilitating the positioning of a bandwidth limited user equipment, comprising:
a memory;
at least one transceiver;
at least one processor communicatively coupled to the memory and the at least one transceiver and configured to:
receive a first set of symbols in a positioning reference signal (PRS), wherein the PRS comprises a plurality of symbols occupying a frequency range and the first set of symbols are in a first portion of the frequency range;
receive a second set of symbols in the PRS in a second portion of the frequency range, the first set of the plurality of symbols comprising different symbols than the second set of the plurality of symbols, and the first portion of the frequency range being non-overlapping in frequency with the second portion of the frequency range; and
obtain measurement information based on the PRS.

25. The apparatus of claim 24 wherein the second set of symbols is received after a retuning gap subsequent to receiving the first set of symbols.

26. The apparatus of claim 25 wherein a duration of the retuning gap is at based at least in part on a subcarrier spacing of the PRS.

27. The apparatus of claim 26 wherein the duration of the retuning gap is 1 or 2 symbols and the subcarrier spacing is 15 kHz.

28. The apparatus of claim 24 wherein the at least one processor is further configured to:
receive a third set of symbols in the PRS occupying the first portion of the frequency range; and
receive a fourth set of symbols in the PRS occupying the second portion of the frequency range.

29. The apparatus of claim 28 wherein the second set of symbols is received after a first retuning gap subsequent to receiving the first set of symbols, the third set of symbols is received after a second retuning gap subsequent to receiving the second set of symbols, and the fourth set of symbols is received after a third retuning gap subsequent to receiving the third set of symbols.

30. The apparatus of claim 24 wherein one or more of the plurality of symbols in the PRS are received in a second slot of a radio frame.

31. An apparatus for facilitating the positioning of a bandwidth limited user equipment with a positioning reference signal (PRS), comprising:
a memory;
at least one transceiver;
at least one processor communicatively coupled to the memory and the at least one transceiver and configured to:
receive a first portion of the PRS in a first frequency range in a first slot of a radio frame; and
receive a second portion of the PRS in a second frequency range in a second slot of the radio frame, wherein the second frequency range is different from, and non-overlapping with, the first frequency range; and
obtain measurement information based on the PRS.

32. The apparatus of claim 31 wherein the at least one processor is further configured to retune at least one transceiver during a tuning gap prior to receiving the second portion of the PRS.

33. The apparatus of claim 32 wherein a duration of the tuning gap is based at least in part on a subcarrier spacing of the PRS.

34. The apparatus of claim 31 wherein the at least one processor is further configured to:
receive a third portion of the PRS in a third frequency range in a third slot of the radio frame; and
receive a fourth portion of the PRS in a fourth frequency range in a fourth slot of the radio frame, wherein the third frequency range is different from the fourth frequency range.

35. The apparatus of claim 31 wherein the at least one processor is further configured to:
receive a third portion of the PRS in the second frequency range in a third slot of the radio frame; and
receive a fourth portion of the PRS in the first frequency range in a fourth slot of the radio frame.

36. The apparatus of claim 31 wherein the at least one processor is further configured to:

receive a first portion of a second PRS in the first frequency range in a third slot of the radio frame, wherein the second PRS is based on a second resource set; and receive a second portion of the second PRS in the second frequency range in a fourth slot of the radio frame.

\* \* \* \* \*